US012040142B2

(12) United States Patent
Dimberg

(10) Patent No.: US 12,040,142 B2
(45) **Date of Patent: *Jul. 16, 2024**

(54) RETROFIT REMOTE CONTROL DEVICE

(71) Applicant: Lutron Technology Company LLC, Coopersburg, PA (US)

(72) Inventor: Chris Dimberg, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,489

(22) Filed: May 8, 2023

(65) Prior Publication Data

US 2023/0274898 A1 Aug. 31, 2023

Related U.S. Application Data

(63) Continuation of application No. 17/553,910, filed on Dec. 17, 2021, now Pat. No. 11,682,534, which is a continuation of application No. 17/072,972, filed on Oct. 16, 2020, now Pat. No. 11,251,002, which is a continuation of application No. 16/777,365, filed on Jan. 30, 2020, now Pat. No. 10,832,880, which is a (Continued)

(51) Int. Cl.

| | |
|---|---|
| ***H01H 23/14*** | (2006.01) |
| ***G08C 17/02*** | (2006.01) |
| ***H01H 3/02*** | (2006.01) |
| ***H01H 19/14*** | (2006.01) |
| ***H05B 47/19*** | (2020.01) |

(52) U.S. Cl.

CPC ........... *H01H 23/145* (2013.01); *G08C 17/02* (2013.01); *H01H 3/02* (2013.01); *H05B 47/19* (2020.01); *H01H 19/14* (2013.01)

(58) Field of Classification Search

None

See application file for complete search history.

(56) References Cited

U.S. PATENT DOCUMENTS 5,264,761 A 11/1993 Johnson et al.
5,905,442 A 5/1999 Mosebrook et al.

(Continued)

FOREIGN PATENT DOCUMENTS

CN 2596671 Y 12/2003
CN 202940744 U 5/2013

(Continued)

*Primary Examiner* — Adolf Dsouza
(74) *Attorney, Agent, or Firm* — Flaster Greenberg P.C.

(57) ABSTRACT

A control device may be configured to be mounted over a bezel portion of an electrical device and to control a lighting load. The control device may comprise a base portion having planar extensions removably attached or affixed thereto. The planar extensions may be adapted to be received in a gap between a faceplate of the electrical device and the bezel portion for holding the control device against the faceplate. The planar extensions may comprise barbs that allow for insertion of the extensions in the gap, and may bite into the faceplate to hinder removal of the control device. The planar extensions may be defined by a mounting structure that is configured to be received in the gap between the bezel portion and the faceplate. The mounting structure may protrude beyond a front surface of the faceplate.

25 Claims, 16 Drawing Sheets

Related U.S. Application Data continuation of application No. 16/257,134, filed on Jan. 25, 2019, now Pat. No. 10,586,667, which is a continuation of application No. 15/612,130, filed on Jun. 2, 2017, now Pat. No. 10,211,013.

(60) Provisional application No. 62/356,053, filed on Jun. 29, 2016, provisional application No. 62/345,485, filed on Jun. 3, 2016.

(56) References Cited

U.S. PATENT DOCUMENTS

| | | | | |
|---|---|---|---|---|
| 7,573,208 | B2 | 8/2009 | Newman et al. | |
| 7,834,856 | B2 | 11/2010 | Grinshpoon et al. | |
| 7,940,167 | B2 | 5/2011 | Steiner et al. | |
| 8,009,042 | B2 | 8/2011 | Steiner et al. | |
| 8,084,700 | B1 | 12/2011 | Massaro et al. | |
| 8,199,010 | B2 | 6/2012 | Sloan et al. | |
| 8,330,638 | B2 | 12/2012 | Altonen et al. | |
| 8,410,706 | B2 | 4/2013 | Steiner et al. | |
| 8,445,779 | B1 * | 5/2013 | Gretz | H02G 3/123 174/53 |
| 8,451,116 | B2 | 5/2013 | Steiner et al. | |
| 8,917,024 | B2 | 12/2014 | Kessler et al. | |
| 9,208,965 | B2 | 12/2015 | Busby et al. | |
| 9,418,802 | B2 | 8/2016 | Romano et al. | |
| 9,520,247 | B1 | 12/2016 | Finnegan et al. | |
| 9,583,288 | B2 | 2/2017 | Jones et al. | |
| 9,799,469 | B2 | 10/2017 | Bailey et al. | |
| 9,959,997 | B2 | 5/2018 | Bailey et al. | |
| 2008/0111491 | A1 | 5/2008 | Spira et al. | |
| 2009/0206983 | A1 | 8/2009 | Knode et al. | |
| 2011/0139965 | A1 | 6/2011 | Sloan et al. | |
| 2011/0259722 | A1 | 10/2011 | Alderson et al. | |
| 2012/0292174 | A1 | 11/2012 | Mah et al. | |
| 2013/0222122 | A1 | 8/2013 | Killo et al. | |
| 2014/0117859 | A1 * | 5/2014 | Swatsky | H05B 47/19 315/158 |
| 2014/0117871 | A1 | 5/2014 | Swatsky et al. | |
| 2015/0077021 | A1 | 3/2015 | McCarthy et al. | |
| 2015/0189725 | A1 | 7/2015 | Karc et al. | |
| 2015/0371534 | A1 | 12/2015 | Dimberg et al. | |
| 2016/0073479 | A1 | 3/2016 | Erchak et al. | |
| 2016/0111813 | A1 | 4/2016 | Ye | |
| 2017/0105176 | A1 | 4/2017 | Finnegan et al. | |
| 2017/0278652 | A1 | 9/2017 | Dimberg et al. | |
| 2018/0190451 | A1 | 7/2018 | Scruggs | |

FOREIGN PATENT DOCUMENTS

| | | | |
|---|---|---|---|
| CN | 204005375 | U | 12/2014 |
| WO | 2017165858 | A2 | 9/2017 |

* cited by examiner

RETROFIT REMOTE CONTROL DEVICE

CROSS-REFERENCE TO RELATED APPLICATIONS

This application is a continuation of U.S. patent application Ser. No. 17/553,910, filed Dec. 17, 2021, which is a continuation of U.S. patent application Ser. No. 17/072,972, filed Oct. 16, 2020, now U.S. Pat. No. 11,251,002, issued on Feb. 15, 2022, which is a continuation of U.S. patent application Ser. No. 16/777,365, filed Jan. 30, 2020, now U.S. Pat. No. 10,832,880, issued on Nov. 10, 2020, which is a continuation of U.S. patent application Ser. No. 16/257,134, filed Jan. 25, 2019, now U.S. Pat. No. 10,586,667, issued on Mar. 10, 2020, which is a continuation of U.S. patent application Ser. No. 15/612,130, filed Jun. 2, 2017, now U.S. Pat. No. 10,211,013, issued on Feb. 19, 2019, which claims the benefit of U.S. Provisional Patent Application No. 62/345,485, filed Jun. 3, 2016, and U.S. Provisional Patent Application No. 62/356,053, filed Jun. 29, 2016, the entire disclosures of which are incorporated by reference herein.

BACKGROUND

A standard switch (e.g., a mechanical toggle switch) in a load control system may be replaced by a load control device (e.g., a dimmer switch). Such a load control device may operate to control an amount of power delivered from an alternative current (AC) power source to an electrical load.

The procedure of replacing a standard switch (e.g., a mechanical toggle switch) with a load control device typically requires disconnecting electrical wiring, removing the standard switch from an electrical wallbox, installing the load control device into the wallbox, and reconnecting the electrical wiring to the load control device.

Often, the aforementioned procedure is performed by an electrical contractor or other skilled installer. Average consumers may not feel comfortable undertaking the electrical wiring to complete installation of a load control device. Accordingly, there is a demand for a load control device that may be installed into an existing electrical system (e.g., a system with a standard mechanical toggle switch), with limited or no electrical wiring work.

SUMMARY

As described herein, a remote control device may provide a simple retrofit solution for an existing switched control system. Implementation of the remote control device, for example in an existing switched control system, may enable energy savings and/or advanced control features, for example without requiring any electrical re-wiring and/or without requiring the replacement of any existing mechanical switches.

The remote control device may be configured to associate with, and control, a load control device of a load control system, without requiring access to the electrical wiring of the load control system. An electrical load may be electrically connected to the load control device such that the remote control device may control an amount of power delivered to the electrical load, via the load control device. When the electrical load is a lighting load, the remote control device may also control a color of the lighting load.

The remote control device may be configured to be mounted over the toggle actuator of a mechanical switch that controls whether power is delivered to the electrical load. The remote control device may be configured to maintain the toggle actuator in an on position when mounted over the toggle actuator, such that a user of the remote control device is not able to mistakenly switch the toggle actuator to the off position, which may cause the electrical load to be unpowered such that the electrical load cannot be controlled by one or more remote control devices.

The remote control device may include a base portion that is configured to be mounted over the toggle actuator of the switch, and a control portion that is supported by the base portion. The remote control device may be configured such that the base portion does not actuate the actuator of the electrical load when a force is applied to the control portion.

The remote control device may include a wireless communication circuit for transmitting and/or receiving wireless control signals to and/or from the electrical load. The wireless control signals may carry commands for controlling one or more operational settings of the electrical load.

The remote control device may comprise a base portion having planar extensions adapted to be received in a gap between the faceplate and the toggle actuator for holding the remote control device against the faceplate. The extensions may comprise barbs that allow for insertion of the extensions in the gap, but may bite into the faceplate to hinder removal of the remote control device.

The planar extensions may be removably attached to a base portion of the remote control device. For example, the planar extensions may be defined by a mounting structure. The mounting structure may be configured to be disposed between a yoke of the mechanical switch and the faceplate, and that protrudes beyond a front surface of the faceplate. The planar extensions may define engagement members that are configured to engage with complimentary features of the base portion to secure the base portion in an attached position relative to the mechanical switch.

DETAILED DESCRIPTION

Figure 1:
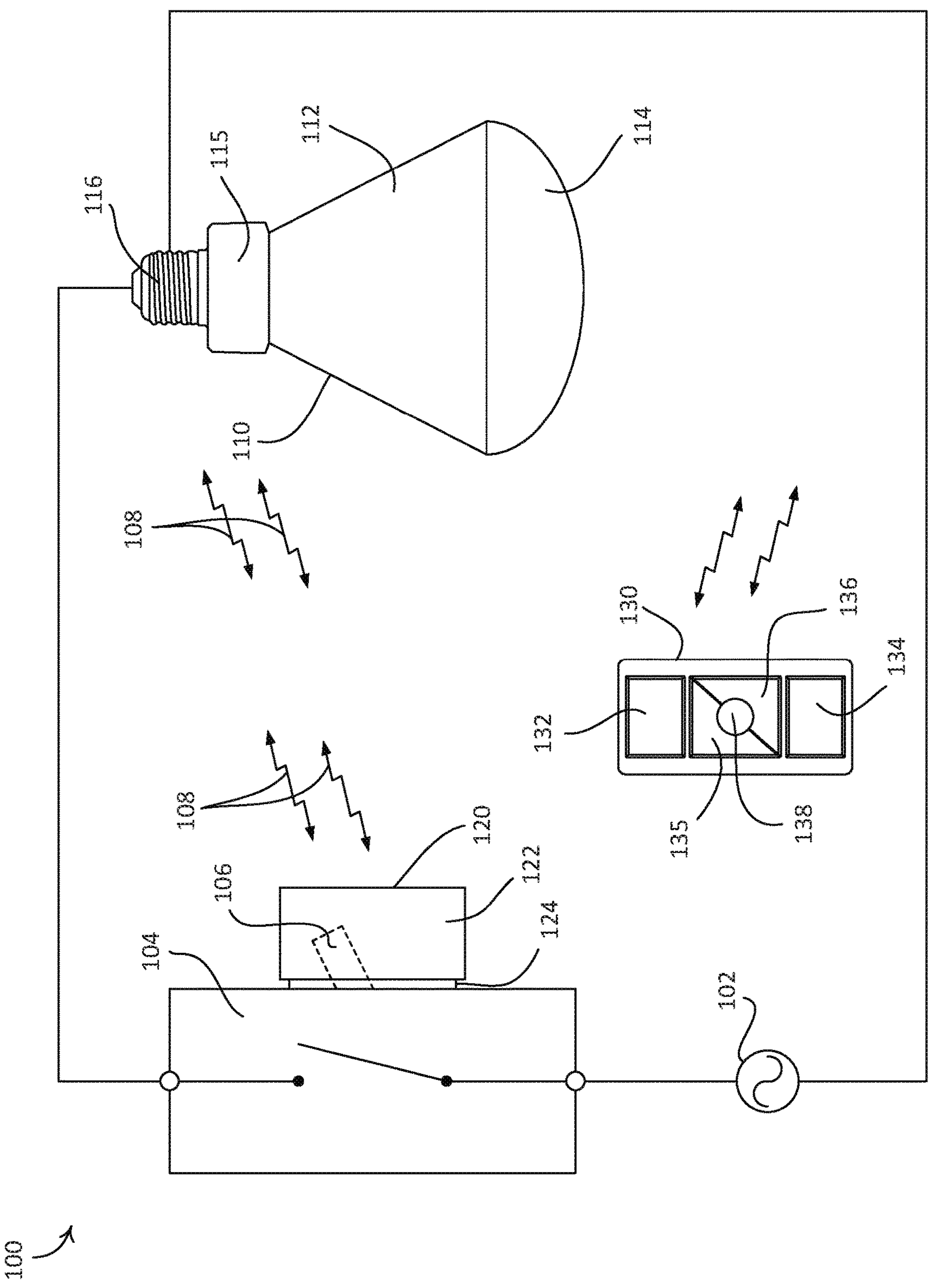
FIG. 1 depicts an example load control system that includes an example remote control device.

FIG. 1 depicts an example load control system 100. As shown, the load control system 100 may be configured as a lighting control system that may include an electrical load (e.g., such as a controllable light source 110), and a remote control device 120 (e.g., such as a battery-powered rotary remote control device). The remote control device 120 may include a wireless transmitter (e.g., a radio frequency (RF) transmitter). The load control system 100 may include a standard, single pole single throw (SPST) maintained mechanical switch 104 (e.g., a toggle switch, a paddle switch, a pushbutton switch, a "light switch," or other suitable switch). The switch 104 may be in place prior to installation of the remote control device 120 (e.g., pre-existing in the load control system 100). The switch 104 may be electrically coupled (e.g., in series) between an alternating current (AC) power source 102 and the controllable light source 110. The switch 104 may include a toggle actuator 106 that may be actuated to toggle (e.g., to turn on and/or turn off) the controllable light source 110. The controllable light source 110 may be electrically coupled to the AC power source 102 when the switch 104 is closed (e.g., conductive), and may be disconnected from the AC power source 102 when the switch 104 is open (e.g., nonconductive).

The remote control device 120 may be operable to transmit wireless signals, for example radio frequency (RF) signals 108, to the controllable light source 110. The wireless signals may be used to control the intensity of the controllable light source 110. The wireless signals may be used to control the color of the light emitted by the controllable light source 110. The controllable light source 110 may be associated with the remote control device 120 (e.g., during a configuration procedure of the load control system 100) such that the controllable light source 110 may be responsive to the RF signals 108 transmitted by the remote control device 120. An example of a configuration procedure for associating a remote control device with a load control device is described in greater detail in commonly-assigned U.S. Patent Publication No. 2008/0111491, published May 15, 2008, entitled "Radio-Frequency Lighting Control System," the entire disclosure of which is hereby incorporated by reference.

The controllable light source 110 may include an internal lighting load (not shown), such as, for example, a light-emitting diode (LED) light engine, a compact fluorescent lamp, an incandescent lamp, a halogen lamp, or other suitable light sources. The controllable light source 110 may include a housing 112. The housing 112 may comprise an end portion 114 through which light emitted from the lighting load may shine. The controllable light source 110 may include an enclosure 115 configured to house one or more electrical components of the controllable light source 110 (e.g., such as an integral load control circuit (not shown). The one or more electrical components may be operable to control the intensity of the lighting load between a low-end intensity (e.g., approximately 1%) and a high-end intensity (e.g., approximately 100%). The one or more electrical components may be operable to control the color of the light emitted by the controllable light source 110. For example, when the controllable light source 110 is an LED light source, the one or more electrical components may be operable to control the color of the LED in a color temperature control mode or a full-color control mode.

The controllable light source 110 may include a wireless communication circuit (not shown) housed inside the enclosure 115, such that the controllable light source 110 may be operable to receive the RF signals 108 transmitted by the remote control device 120, and to control the intensity and/or color of the lighting load in response to the received RF signals. The enclosure 115 may be attached to the housing 112 (e.g., as shown in FIG. 1). The enclosure 115 may be integral with (e.g., monolithic with) the housing 112, such that the enclosure 115 may define an enclosure portion of the housing 112. The controllable light source 110 may include a screw-in base 116 configured to be screwed into a standard Edison socket, such that the controllable light source may be coupled to the AC power source 102. The controllable light source 110 may be configured as a downlight (e.g., as shown in FIG. 1) that may be installed in a recessed light fixture. The controllable light source 110 may not be limited to the illustrated screw-in base 116, and may include any suitable base (e.g., a bayonet-style base or other suitable base providing electrical connections).

As described herein, the switch 104 may be in place prior to installation of the remote control device 120 (e.g., pre-existing in the load control system 100). The switch 104 may be configured to perform simple tasks such as turning on and/or turning off (e.g., via the toggle actuator 106) the controllable light source 110. An example purpose of the remote control device 120 may be to allow a user to control additional aspects of the controllable light source 110 (e.g., such as light intensity and color). Another example purpose of the remote control device 120 may be to provide a user with feedback regarding the type and/or outcome of the control exercised by the user. As described herein, both of the foregoing purposes may be fulfilled with limited or no additional electrical wiring work.

The remote control device 120 may be configured to be mounted over the toggle actuator 106 of the switch 104. For example, the remote control device 120 may be mounted over the toggle actuator 106 when it is in the on position and when the switch 104 is closed and conductive. As shown in FIG. 1, the remote control device 120 may include a control portion 122 (e.g., including one or more actuators, a rotating portion, and/or a touch sensitive surface) and a base portion 124. The base portion 124 may be configured to be mounted over the toggle actuator 106 of the switch 104, and the control portion 122 may be supported by the base portion 124. The base portion 124 may be configured to maintain the toggle actuator 106 in the on position. In this regard, the base portion 124 may be configured such that a user is not able to inadvertently switch the toggle actuator 106 to the off position when the remote control device 120 is attached to the switch 104. Greater detail of examples of the remote control device 120 will be provided herein, after a brief discussion of other components that may be included in the load control system 100.

The load control system 100 may include one or more other devices configured to communicate (e.g., wirelessly communicate) with the controllable light source 110. For example, the load control system 100 may include a battery-powered, remote control device 130 (e.g., as shown in FIG. 1) for controlling the controllable light source 110. The remote control device 130 may include one or more buttons, for example, an on button 132, an off button 134, a raise button 135, a lower button 136, and a preset button 138, as shown in FIG. 1. The remote control device 130 may include a wireless communication circuit (not shown) for transmitting digital messages (e.g., including commands to control the light source 110) to the controllable light source 110 (e.g., via the RF signals 108) responsive to actuations of one or more of the buttons 132, 134, 135, 136, and 138. The remote control device 130 may be handheld or mounted to a wall or supported by a pedestal (e.g., a pedestal configured to be mounted on a tabletop). Examples of battery-powered remote controls are described in greater detail in commonly assigned U.S. Pat. No. 8,330,638, issued Dec. 11, 2012, entitled "Wireless Battery Powered Remote Control Having Multiple Mounting Means," and U.S. Pat. No. 7,573,208, issued Aug. 11, 2009, entitled "Method Of Programming A Lighting Preset From A Radio-Frequency Remote Control," the entire disclosures of which are hereby incorporated by reference.

The load control system 100 may include one or more of a remote occupancy sensor or a remote vacancy sensor (not shown) for detecting occupancy and/or vacancy conditions in a space surrounding the sensors. The occupancy or vacancy sensors may be configured to transmit digital messages to the controllable light source 110, for example via the RF signals 108, in response to detecting occupancy or vacancy conditions. Examples of RF load control systems having occupancy and vacancy sensors are described in greater detail in commonly-assigned U.S. Pat. No. 7,940,167, issued May 10, 2011, entitled "Battery Powered Occupancy Sensor," U.S. Pat. No. 8,009,042, issued Aug. 30, 2011, entitled "Radio Frequency Lighting Control System With Occupancy Sensing," and U.S. Pat. No. 8,199,010, issued Jun. 12, 2012, entitled "Method And Apparatus For Configuring A Wireless Sensor," the entire disclosures of which are hereby incorporated by reference.

The load control system 100 may include a remote daylight sensor (not shown) for measuring a total light intensity in the space around the daylight sensor. The daylight sensor may be configured to transmit digital messages, such as a measured light intensity, to the controllable light source 110, for example via the RF signals 108, such that the controllable light source 110 is operable to control the intensity of the lighting load in response to the measured light intensity. Examples of RF load control systems having daylight sensors are described in greater detail in commonly assigned U.S. Pat. No. 8,451,116, issued May 28, 2013, entitled "Wireless Battery-Powered Daylight Sensor," and U.S. Pat. No. 8,410,706, issued Apr. 2, 2013, entitled "Method Of Calibrating A Daylight Sensor," the entire disclosures of which are hereby incorporated by reference.

The load control system 100 may include other types of devices capable of communicating signals for load control, for example, radiometers, cloudy-day sensors, temperature sensors, humidity sensors, pressure sensors, smoke detectors, carbon monoxide detectors, air-quality sensors, security sensors, proximity sensors, fixture sensors, partition sensors, keypads, kinetic or solar-powered remote controls, key fobs, cell phones, smart phones, tablets, personal digital assistants, personal computers, laptops, time clocks, audio-visual controls, safety devices, power monitoring devices (such as power meters, energy meters, utility submeters, utility rate meters), central control transmitters, residential, commercial, or industrial controllers, or any combination of these devices.

The controllable light source 110 may be associated with a wireless control device (e.g., the remote control device 120) during a configuration procedure of the load control system 100. For example, the association may be accomplished by actuating an actuator on the controllable light source 110 and actuating (e.g., pressing and holding) an actuator on the wireless remote control device (e.g., a rotating portion 222 of a control module 220 shown in FIG. 3) for a predetermined amount of time (e.g., approximately 10 seconds).

Digital messages transmitted by the remote control device 120 (e.g., messages directed to the controllable light source 110) may include a command and identifying information, such as a unique identifier (e.g., a serial number) associated with the remote control device 120. After being associated with the remote control device 120, the controllable light source 110 may be responsive to messages containing the unique identifier of the remote control device 120. The controllable light source 110 may be associated with one or more other wireless control devices of the load control system 100 (e.g., the remote control device 130, the occupancy sensor, the vacancy sensor, and/or the daylight sensor), for example using similar association process.

After a remote control device (e.g., the remote control device 120 or the remote control device 130) is associated with the controllable light source 110, the remote control device may be used to associate the controllable light source 110 with the occupancy sensor, the vacancy sensor, and/or the daylight sensor (e.g., without actuating the actuator 118 of the controllable light source 110). Examples for associating an electrical load with one or more sensors are described in greater detail in commonly-assigned U.S. Patent Application Publication No. 2013/0222122, published Aug. 29, 2013, entitled "Two Part Load Control System Mountable To A Single Electrical Wallbox," the entire disclosure of which is hereby incorporated by reference.

In an example configuration, the remote control device 120 may be mounted over a toggle actuator of a switch (e.g., the toggle actuator 106). In such a configuration, the base portion 124 may function to secure the toggle actuator 106 from being toggled. For example, the base portion 124 may be configured to maintain the toggle actuator 106 in an on position, such that a user of the remote control device 120 is not able to mistakenly switch the toggle actuator 106 to the off position (which may disconnect the controllable light source 110 from the AC power source 102). Maintaining the toggle actuator 106 in the on position may also prevent the controllable light source 110 from being controlled by one or more remote control devices of the load control system 100 (e.g., the remote control devices 120 and/or 130), which may cause user confusion.

The remote control device 120 may be battery-powered (e.g., not wired in series electrical connection between the AC power source 102 and the controllable light source 110). Since the mechanical switch 104 is kept closed (e.g., conductive), the controllable light source 110 may continue to receive a full AC voltage waveform from the AC power source 102 (e.g., the controllable light source 110 does not receive a phase-control voltage that may be created by a standard dimmer switch). Because the controllable light source 110 receives the full AC voltage waveform, multiple controllable light sources (e.g., more than one controllable light sources 110) may be coupled in parallel on a single electrical circuit (e.g., coupled to the mechanical switch 104). The multiple controllable light sources may include light sources of different types (e.g., incandescent lamps, fluorescent lamps, and/or LED light sources). The remote control device 120 may be configured to control one or more of the multiple controllable light sources, for example substantially in unison. In addition, if there are multiple controllable light sources coupled in parallel on a single circuit, each controllable light source may be zoned, for example to provide individual control of each controllable light source. For example, a first controllable light 110 source may be controlled by the remote control device 120, while a second controllable light source 110 may be controlled by the remote control device 130.

The remote control device 120 may be part of a larger RF load control system than that depicted in FIG. 1. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," and commonly-assigned U.S. Patent Application Publication No. 2009/0206983, published Aug. 20, 2009, entitled "Communication System For A Radio Frequency Load Control System," the entire disclosures of which are incorporated herein by reference.

While the load control system 100 was described with reference to the single-pole system shown in FIG. 1, one or both of the controllable light source 110 and the remote control device 120 may be implemented in a "three-way" lighting system having two single-pole double-throw (SPDT) mechanical switches (e.g., a "three-way" switch) for controlling a single electrical load. For example, the system could comprise two remote control devices 120, with one remote control device 120 connected to the toggle actuator of each SPDT switch. The toggle actuators of the respective SPDT switches may be positioned such that the SPDT switches form a complete circuit between the AC source and the electrical load before the remote control devices 120 are installed on the toggle actuators.

The load control system 100 shown in FIG. 1 may provide a retrofit solution for an existing load control system. The load control system 100 may provide energy savings and/or advanced control features, for example without requiring significant electrical re-wiring and/or without requiring the replacement of existing mechanical switches. As an example, to install and use the load control system 100 of FIG. 1, a consumer may replace an existing lamp with the controllable light source 110, switch the toggle actuator 106 of the mechanical switch 104 to the on position, install (e.g., mount) the remote control device 120 onto the toggle actuator 106, and associate the remote control device 120 with the controllable light source 110, as described herein.

It should be appreciated that the load control system 100 is not limited to including the controllable light source 110. For example, in lieu of the controllable light source 110, the load control system 100 may alternatively include a plug-in load control device for controlling an external lighting load. For example, the plug-in load control device may be configured to be plugged into a receptacle of a standard electrical outlet that is electrically connected to an AC power source. The plug-in load control device may have one or more receptacles to which one or more plug-in electrical loads (e.g., a table lamp or a floor lamp) may be plugged. The plug-in load control device may be configured to control the intensity and/or light color of the lighting loads plugged into the receptacles of the plug-in load control device. It should further be appreciated that the remote control device 120 is not limited to being associated with, and controlling, a single load control device. For example, the remote control device 120 may be configured to control multiple controllable load control devices (e.g., substantially in unison).

Examples of remote control devices configured to be mounted over existing switches (e.g., light switches) are described in greater detail in commonly-assigned U.S. Patent Application Publication No. 2014/0117871, published May 1, 2014, and U.S. Patent Application Publication No. 2015/0371534, published Dec. 24, 2015, both entitled "Battery-Powered Retrofit Remote Control Device," the entire disclosures of which are hereby incorporated by reference.

FIGS. 2-8 depict an example remote control device 200 (e.g., a battery-powered remote control device) that may be deployed as the remote control device 120 of the load control system 100 shown in FIG. 1. The remote control device 200 may be configured to be mounted over an actuator (e.g., a paddle actuator) of a standard light switch, such as the paddle actuator 204 of a standard decorator paddle style light switch 202 shown in FIG. 6. As shown, the paddle actuator 204 may be surrounded by a bezel portion 205. The light switch 202 may include a faceplate 206. The faceplate 206 may define an opening 208 (e.g., a decorator-type opening) that extends therethrough. The faceplate 206 may be mounted via faceplate screws 209, for instance to a yoke (not shown) of the switch 202. The standard light switch 202 may be coupled in series electrical connection between an alternating current (AC) power source and one or more electrical loads.

As shown, the remote control device 200 may include a base portion 212 and an actuation portion 210 that is configured to be mounted to the base portion 212. The actuation portion 210 may include an actuator 211. The actuator 211 may comprise a front surface 214 that defines a user interface of the actuation portion 210. As shown, the actuator 211 may be configured such that the front surface 214 includes an upper portion 216 and a lower portion 218. The actuation portion 210 may include a light bar 220 that is configured to visibly display information at the front surface 214. The base portion 212 of the remote control device 200 may be mounted over the paddle actuator 204 of the light switch 202 when the paddle actuator is in the on position.

The actuation portion 210 may be configured for mechanical actuation of the actuator 211. For example, the actuator 211 may be supported about a pivot axis P1 that extends laterally between the upper and lower portions 216, 218. The actuation portion 210 may include mechanical switches 260 (e.g., as shown in FIG. 35) disposed in respective interior portions of the actuator 211 that correspond to the upper and lower portions 216, 218 of the front surface 214. Actuations of the upper portion 216 of the front surface 214, for example via the application of a force to the upper portion 216 (e.g., resulting from a finger press) may cause the actuator 211 to rotate about the pivot axis P1 such that the upper portion 216 moves inward towards the base portion 212 and actuates a corresponding mechanical switch 260. Actuations of the lower portion 218 of the front surface 214, for example via the application of a force to the lower portion 218 (e.g., resulting from a finger press) may cause the actuator 211 to rotate about the pivot axis P1 such that the lower portion 218 moves inward towards the base portion 212 and actuates a corresponding mechanical switch 260. The actuation portion 210 may be configured such that actuations of actuator 211 are tactile actuations. For instance, actuations of the actuator 211 may provide tactile feedback to a user of the remote control device 200. The actuator 211 may be configured to resiliently reset to a rest position after actuations of the upper and lower portions 216, 218.

The remote control device 200 may transmit commands to one or more controlled electrical loads (e.g., one or more lighting loads that are associated with the remote control device 200) in response to actuations applied to the actuation portion 210, for instance via the actuator 211. The remote control device 200 may transmit commands to turn on one or more associated lighting loads in response to actuations applied to the upper portion 216 of the front surface 214, and may transmit commands to turn off one or more lighting loads in response to actuations applied to the lower portion 218 of the front surface 214. In accordance with an example implementation, the remote control device 200 may be configured to transmit commands in response to receiving predetermined actuations at the actuation portion (e.g., via the actuator 211). For example, the remote control device 200 may be configured to transmit a command to turn one or more associated lighting loads on to full (e.g., 100% intensity) in response to a double tap applied to the upper portion 216 of the front surface 214 (e.g., two actuations applied to the upper portion 216 in quick succession). The remote control device 200 may be configured to transmit a command to perform a relative adjustment of intensity (e.g., relative to a starting intensity) in response to respective press and hold actuations applied to the upper and/or lower portions 216, 218 of the front surface 214. For example, the remote control device 200 may cause the respective intensities of one or more associated lighting loads to continually be adjusted (e.g., relative to corresponding starting intensities) while one of the upper or lower portions 216, 218 is continuously actuated.

The front surface 214 of the actuator 211 may further be configured as a touch sensitive surface (e.g., may include or define a capacitive touch surface). The capacitive touch surface may extend into portions of both the upper and lower surfaces 216, 218 of the front surface 214. This may allow the actuation portion 210 (e.g., the actuator 211) to receive and recognize actuations (e.g., touches) of the front surface 214 that do not cause the actuator 211 to move at all or to move such that the respective mechanical switches 260 that correspond to the upper and lower portions 216, 218 are not actuated. For example, such actuations of the front surface 214 (e.g., adjacent the light bar 220) may cause the remote control device 200 to transmit commands to adjust the intensity of a lighting load that is associated with the remote control device 200.

To illustrate, the remote control device 200 may be configured such that when a user of the remote control device 200 touches the light bar 220 at a location along a length of the light bar 220, the lighting load be set to an intensity that is dependent upon the location of the actuation along the light bar 220. The remote control device 200 may be configured such that when a user slides a finger along the light bar 220, the intensity of an associated lighting load may be raised or lowered according to the position of the finger along the length of the light bar 220. In response to a touch received on the front surface 214 (e.g., adjacent the light bar 220) the light bar 220 may be configured to illuminate along a length that extends from the bottom of the light bar 220 to a position along the length of the light bar 220. The length of such an illumination (e.g., as defined by an amount of the light bar 220 that is illuminated) may correspond to and be indicative of an intensity of an associated lighting load that results from the actuation.

The remote control device 200 may be configured to, if more than one actuation is received via the actuator 211 within a short interval of time (e.g., at substantially the same time), determine which actuation should be responded to, for example by transmitting a command, and which actuation or actuations may be ignored. To illustrate, a user of the remote control device 200 may press the front surface 214 at a location proximate to the light bar 220, with sufficient force such that the actuator 211 pivots about the pivot axis and activates a corresponding one of the mechanical switches 260. Such an operation of the actuator 211 may comprise multiple actuations of the actuation portion 210. For instance, the location of the press of the front surface 214 along the light bar 220 may correspond to an indication of a desired intensity level of an associated lighting load, while the actuation of the mechanical switch 260 may be correspond to an indication by the user to turn on the lighting load to a last-known intensity. The remote control device 200 may be configured to in response to such actuations, ignore the capacitive touch input indication of intensity, and to transmit a command to the associated lighting load to turn on at the last-known intensity. It should be appreciated that the above is merely one illustration of how the remote control device 200 may be configured to respond to multiple such multi-part actuations of the actuation portion 210.

In accordance with the illustrated actuator 211, the upper portion 216 and the lower portion 218 of the front surface 214 define respective planar surfaces that are angularly offset relative to each other. In this regard, the touch sensitive portion of the front surface 214 of the actuator 211 may define and operate as a non-planar slider control of the remote control device 200. However, it should be appreciated that the actuator 211 is not limited to the illustrated geometry defining the upper and lower portions 216, 218. For example, the actuator 211 may be alternatively configured to define a front surface having any suitable touch sensitive geometry, for instance such as a curved or wave-shaped touch sensitive surface.

FIGS. 7-12 depict the example remote control device 200, with the remote control device 200 unmounted from the light switch 202. As shown, the remote control device 200 may include a carrier 230 that may be configured to be attached to a rear surface of the actuation portion 210. The carrier 230 may support a flexible printed circuit board (PCB) 232 on which a control circuit (not shown) may be mounted. The remote control device 200 may include a battery 234 for powering the control circuit. The battery 234 may be received within a battery opening 236 defined by the carrier 230. The remote control device 200 may include a plurality of light-emitting diodes (LEDs) that may be mounted to the printed circuit board 232. The LEDs may be arranged to illuminate the light bar 220.

Figure 13:
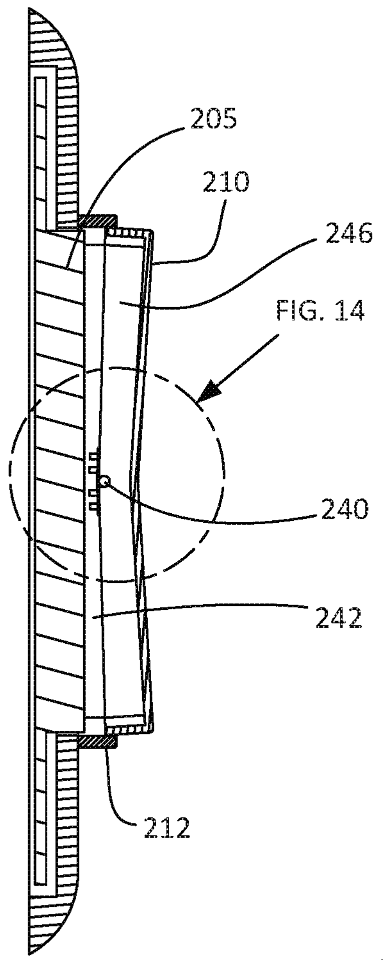
FIG. 13 is a left side sectional view of the example remote control device illustrated in FIGS. 2 and 3.
Figure 14:
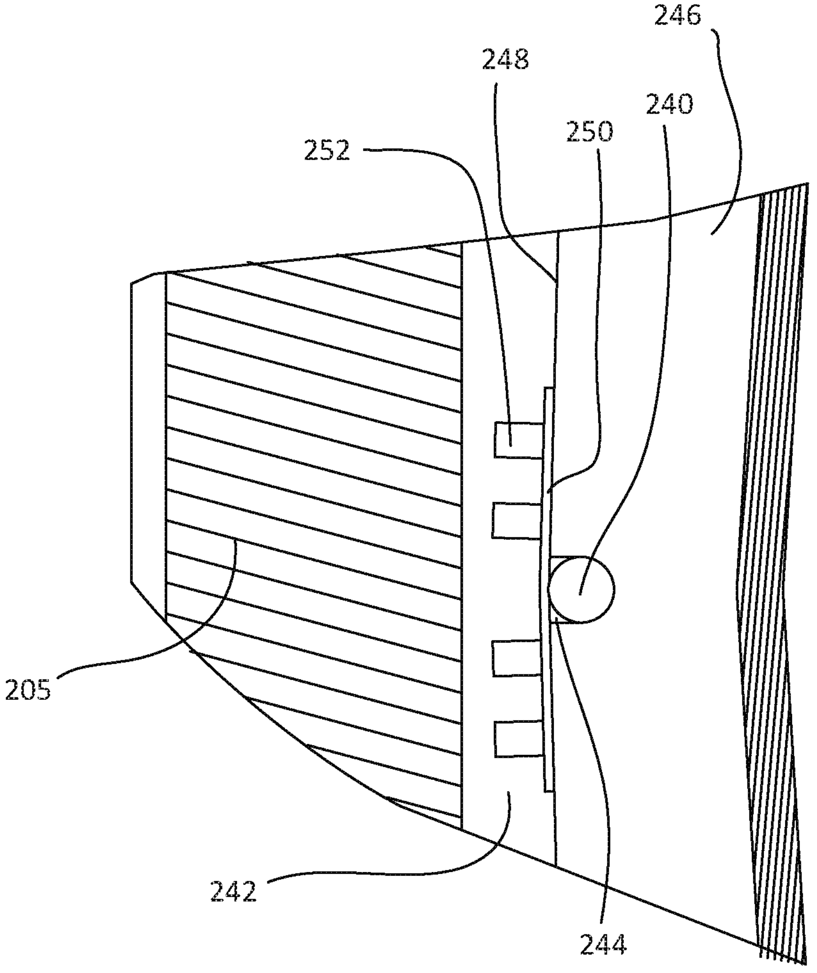
FIG. 14 is an enlarged portion of the sectional view depicted in FIG. 13.

With reference to FIGS. 13 and 14, the actuator 211 may be pivotally coupled to, or supported by, the base portion 212. For example, as shown the base portion 212 may define cylindrical protrusions 240 that extend outward from opposed sidewalls 242 of the base portion 212. The protrusions 240 may be received within openings 244 that extend into rear surfaces 248 of corresponding sidewalls 246 of the actuator 211. The protrusions 240 may define the pivot axis P1 about which the actuator 211 may pivot. As shown, each protrusion 240 may be held in place within a corresponding opening 244 by a respective hinge plate 250 (e.g., thin metal hinge plates). Each hinge plate 250 may be connected to the rear surface 248 of a respective sidewall 246, for example via heat stakes 252. It should be appreciated that for the sake of simplicity and clarity, the heat stakes 252 are illustrated in FIGS. 32 and 33 in an undeformed or unmelted state. The hinge plates 250 may be sized and located to maintain a distance between the hinge plate 250 and the bezel portion 205 of the light switch 202. The hinge plates 250 may be thin to minimize the total depth of the remote control device 200 (e.g., the distance between the front surface of the actuation portion 210 and the front surface of the faceplate 206).

Figure 15:
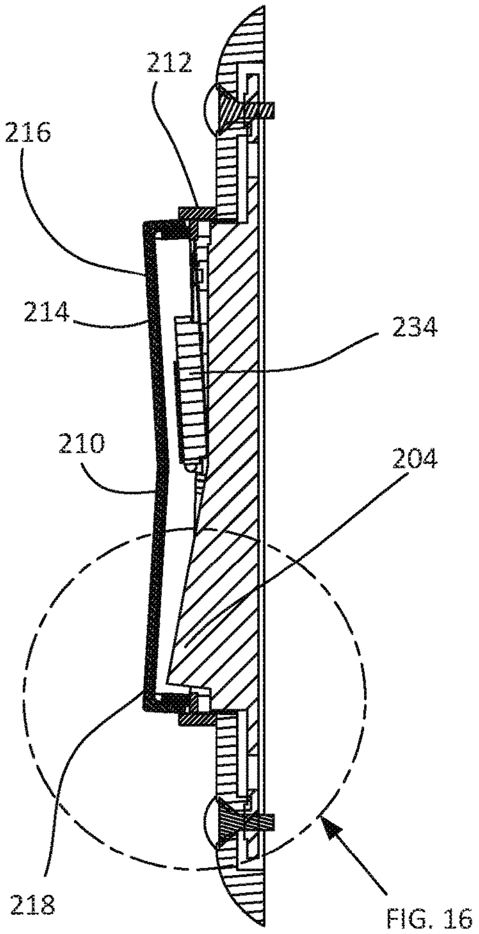
FIG. 15 is a right side sectional view of the example remote control device illustrated in FIGS. 2 and 3.
Figure 16:
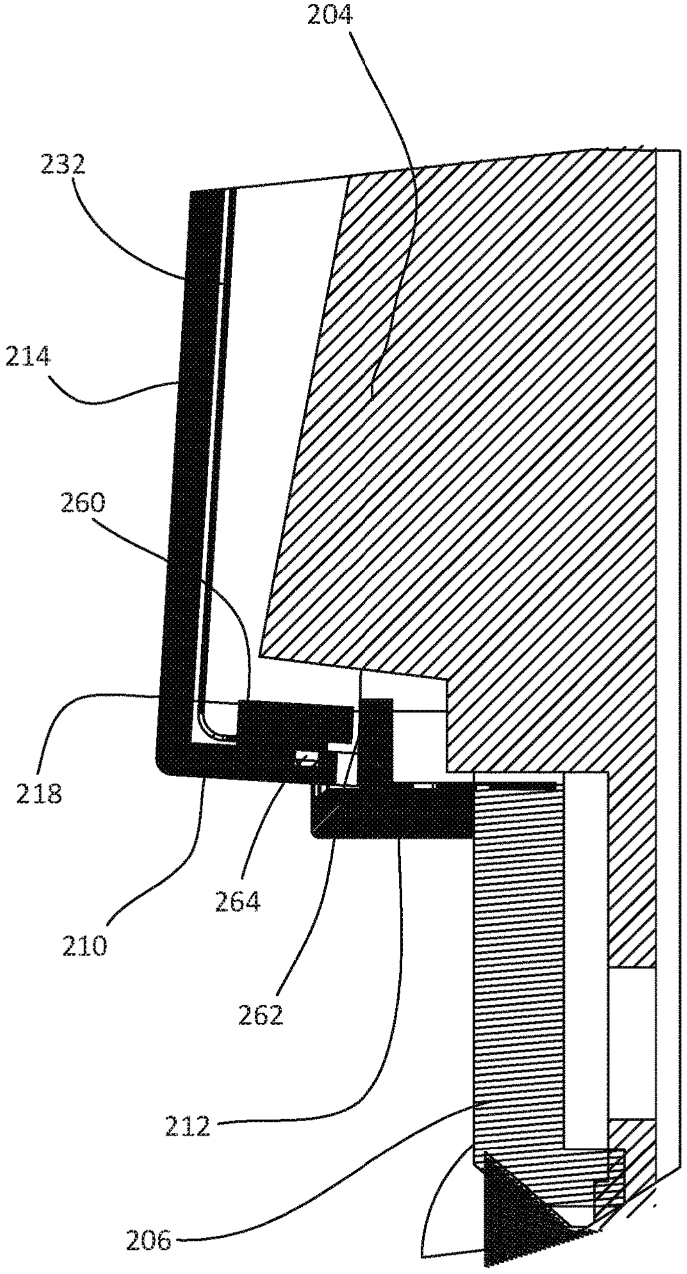
FIG. 16 is an enlarged portion of the sectional view depicted in FIG. 15.
Figure 17:
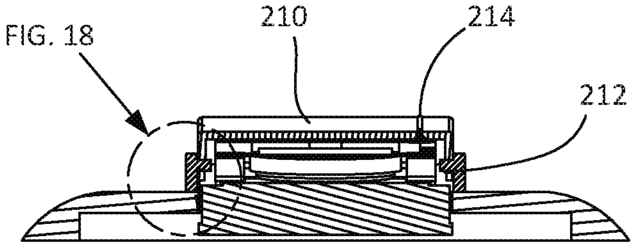
FIG. 17 is a bottom sectional view of the example remote control device illustrated in FIGS. 2 and 3.

Referring now to FIGS. 15 and 16, as shown the protruding portion of the paddle actuator 204 of the light switch 202 may be located in a recess 254 in the rear of the actuation portion 210 when the remote control device 200 is mounted over the paddle actuator (e.g., in the portion of the remote control device that is not occupied by the battery 234). The flexible PCB 232 may be located immediately behind the front surface 214 of the actuation portion 210 and may include capacitive touch traces such that the front surface 214 defines a capacitive touch surface. Actuations applied to the upper and lower portions 216, 218 of the front surface 214 of the actuation portion 210 may also provide tactile feedback, for instance as described herein. The remote control device 200 may include one or more mechanical tactile switches 260 (e.g., side-actuating tactile switches) that may be mounted to and electrically coupled to the flexible PCB 232. For example, the remote control device 200 may include a first mechanical tactile switch 260 that is mounted so as to be activated by an actuation applied to the upper portion 216 of the front surface 214 and a second mechanical tactile switch 260 that is mounted so as to be activated by an actuation applied to the lower portion 218 of the front surface 214. The mechanical tactile switches 260 may be positioned such that respective actuation portions of the mechanical tactile switches 260 are positioned proximate to corresponding contact surfaces 262 defined by the base portion 212. Each mechanical tactile switch 260 may include a foot 264 that is captively retained in a corresponding opening of the actuator 211.

The flexible PCB 232 may bend towards the locations in which the mechanical tactile switches 260 are located. In accordance with the illustrated configuration, when a force is applied to the lower portion 218 of the front surface 214 that causes the lower portion 218 to pivot inward about the pivot axis P1 towards the base portion 212, the actuation portion of the corresponding mechanical tactile switch 260 may make contact with the contact surface 262, thereby causing activation of the mechanical tactile switch 260. The mechanical tactile switch 260 may operate to return the actuator 211 to a rest position. Return of the actuator 211 to the rest position may provide tactile feedback indicative of activation of the mechanical tactile switch 260. The mechanical tactile switch 260 may be electrically coupled to the control circuit on the flexible PCB 232, such that the control circuit is responsive to the actuation of the mechanical tactile switch 260.

Alternatively, the mechanical tactile switches 260 may not be electrically coupled to the flexible PCB 232 and may operate merely to provide tactile feedback responsive to actuations of the actuator 211. In such an implementation, the control circuit may be responsive to the capacitive touch surface of the front surface 214 to determine a location of an actuation, for instance to determine whether the upper portion 216 or the lower portion 218 of the front surface 214 was actuated. Further, the mechanical tactile switches 260 may be coupled to the base portion 212 rather than the actuator 211 for providing tactile feedback.

The actuation portion 210 of the remote control device 200 shown in FIGS. 2-5 may be configured to pivot about a pivot axis to allow for actuations of upper and lower portions (e.g., to turn the controlled electrical load on and off, respectively). The remote control device 200 may include mechanical tactile switches to provide tactile feedback in response to actuations of the upper and lower portions of the actuation portion 210. In addition, the remote control device 200 may be configured to raise and lower the intensity of the controlled lighting load in response to actuations of the upper and lower portions, respectively. The actuation portion may include a touch-sensitive surface (e.g., a capacitive touch surface).

Figure 6:
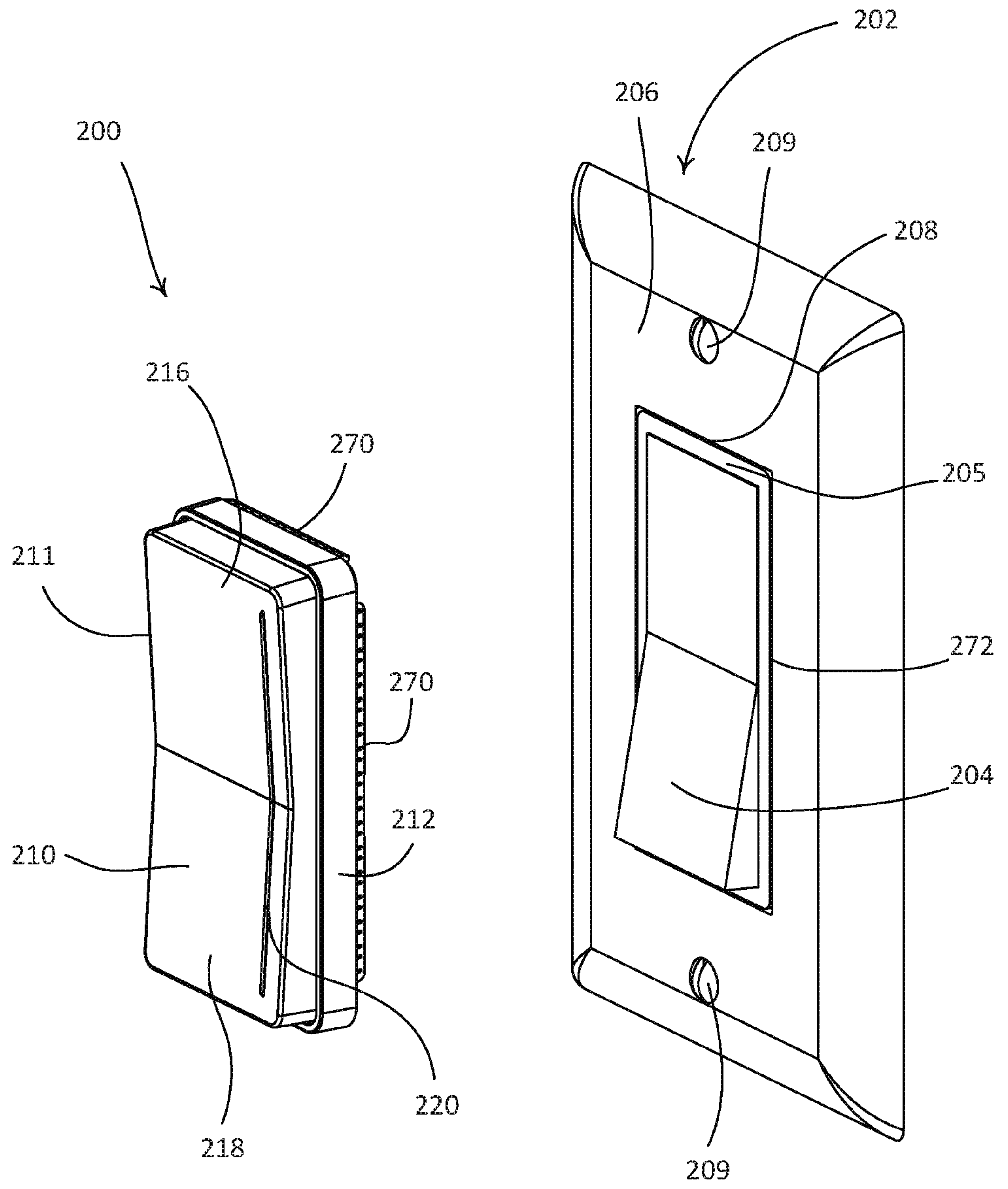
FIG. 6 shows a perspective view of the example remote control device with a control module detached from a base portion.
Figure 7:
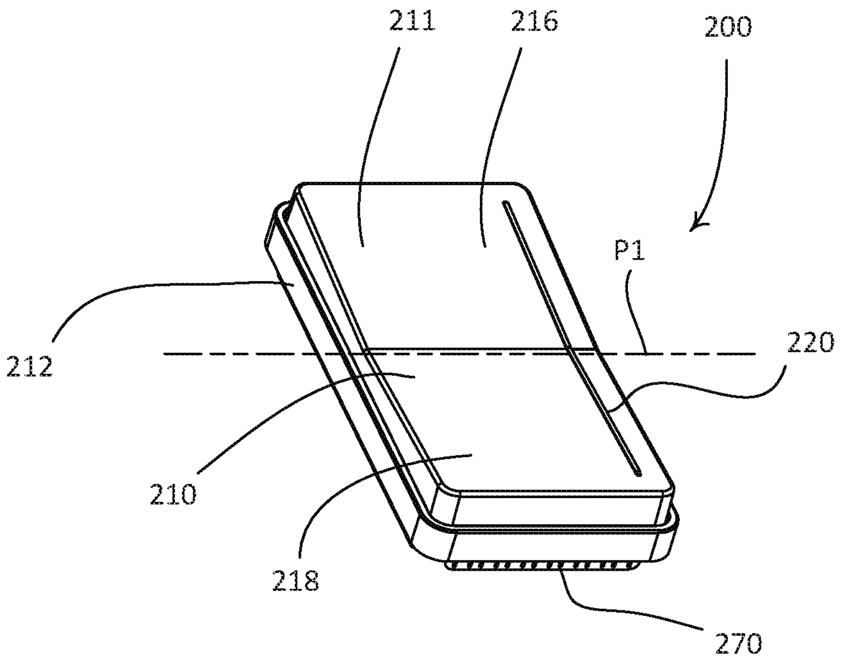
FIG. 7 is a front perspective view of the example remote control device illustrated in FIGS. 2 and 3, with the remote control device unmounted from the light switch.

The remote control device 200 may include a mounting structure that is configured to enable attachment of the remote control device 200 to a standard light switch, such as the standard decorator style light switch 202 shown in FIG. 6. For example, as shown the remote control device 200 may include a mounting structure having a plurality of extensions 270 (e.g., thin, flat planar extensions) that protrude outward from the base portion 212. The mounting structure may be configured to be attached to the base portion 212. Alternatively, the mounting structure may be monolithic with the base portion 212.

Figure 18:
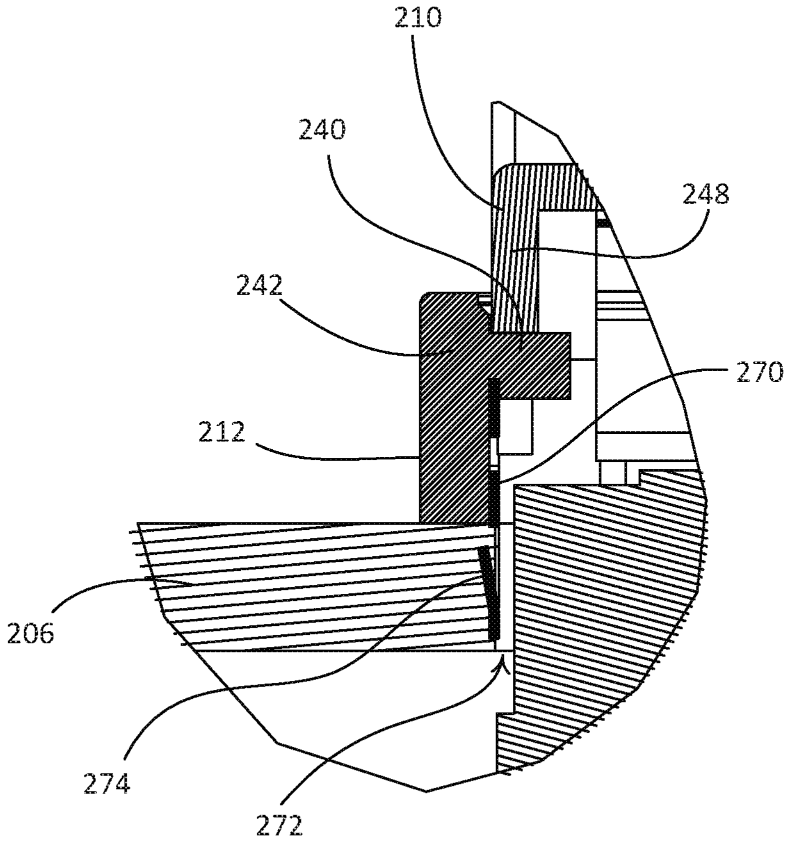
FIG. 18 is an enlarged portion of the sectional view depicted in FIG. 17.

The extensions 270 may be configured to be disposed into a gap 272 defined between the bezel portion 205 and the opening 208 of the faceplate 206 of the light switch 202. The extensions 270 may operate to maintain the remote control device 200 in a mounted position relative to the light switch 202, for example such that the base portion 212 abuts corresponding portions of the faceplate 206. Each extension 270 may be configured to allow insertion of the extension 270 into the gap 272 and to resist removal of the extensions from the gap 272 once the remote control device 200 is secured in a mounted position relative to the light switch. For example, as shown in FIG. 18, each extension 270 may define a plurality of barbs 274. The barbs 274 may be configured as spring-style barbs that are configured to deflect and slide along structure of the faceplate 206 as the extensions 270 are inserted into the gap 272 along a first direction, and to bite into surrounding structure of the faceplate 206 when pulled in an opposed second direction to hinder removal of the remote control device 200 from the light switch 202. The mounting structure may be made of any suitable material, such as metal.

Figure 2:
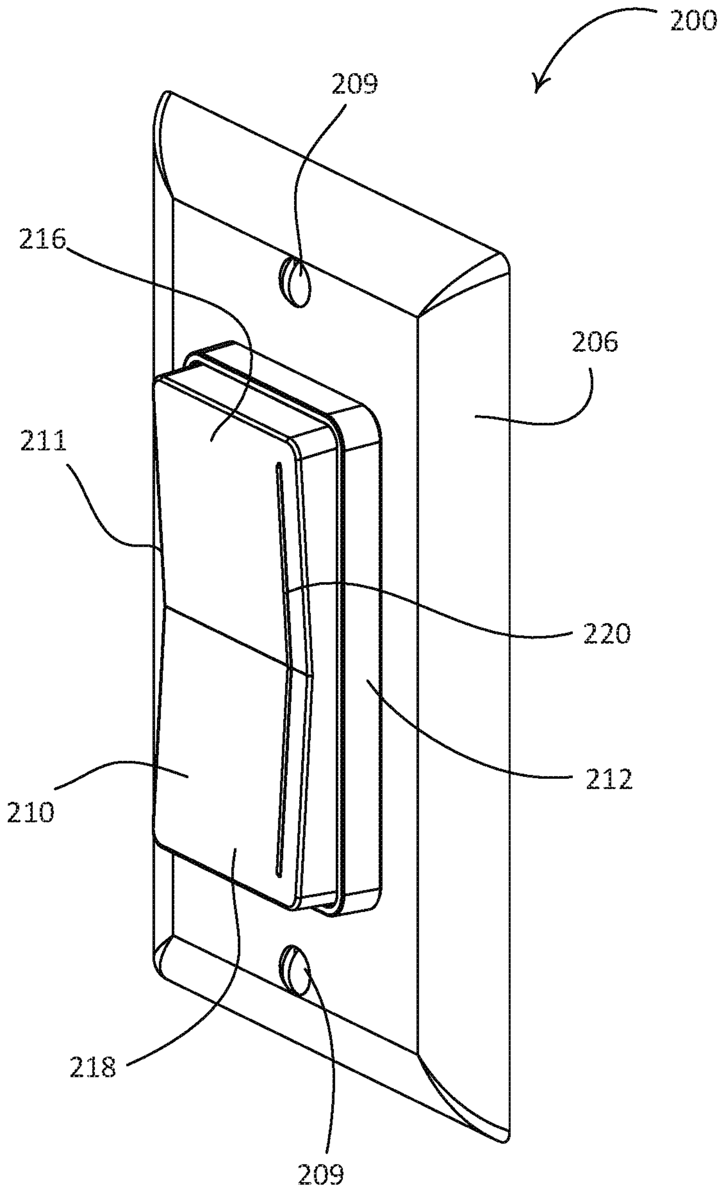
FIGS. 2 and 3 are perspective views of an example remote control device.
Figure 3:
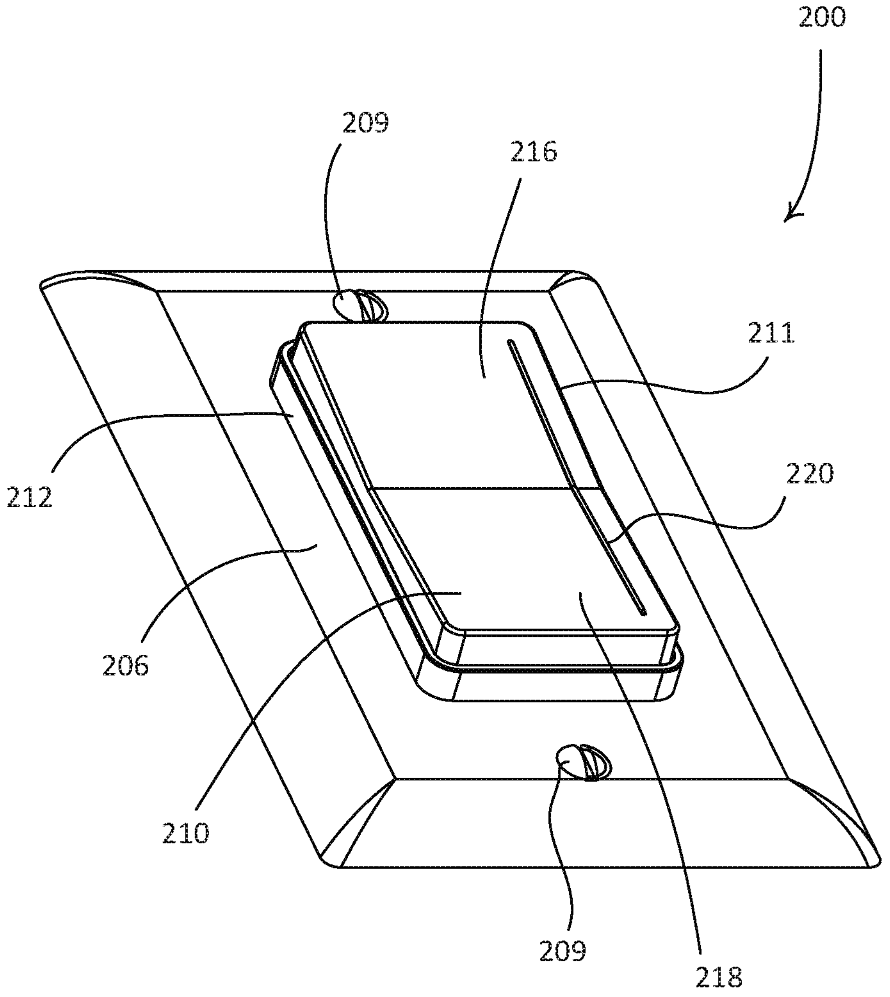
Figure 5:
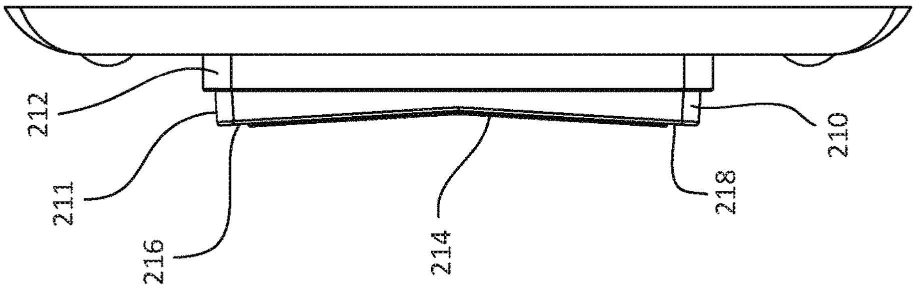
FIG. 5 is a right side view of the example remote control device illustrated in FIGS. 2 and 3.
Figure 4:
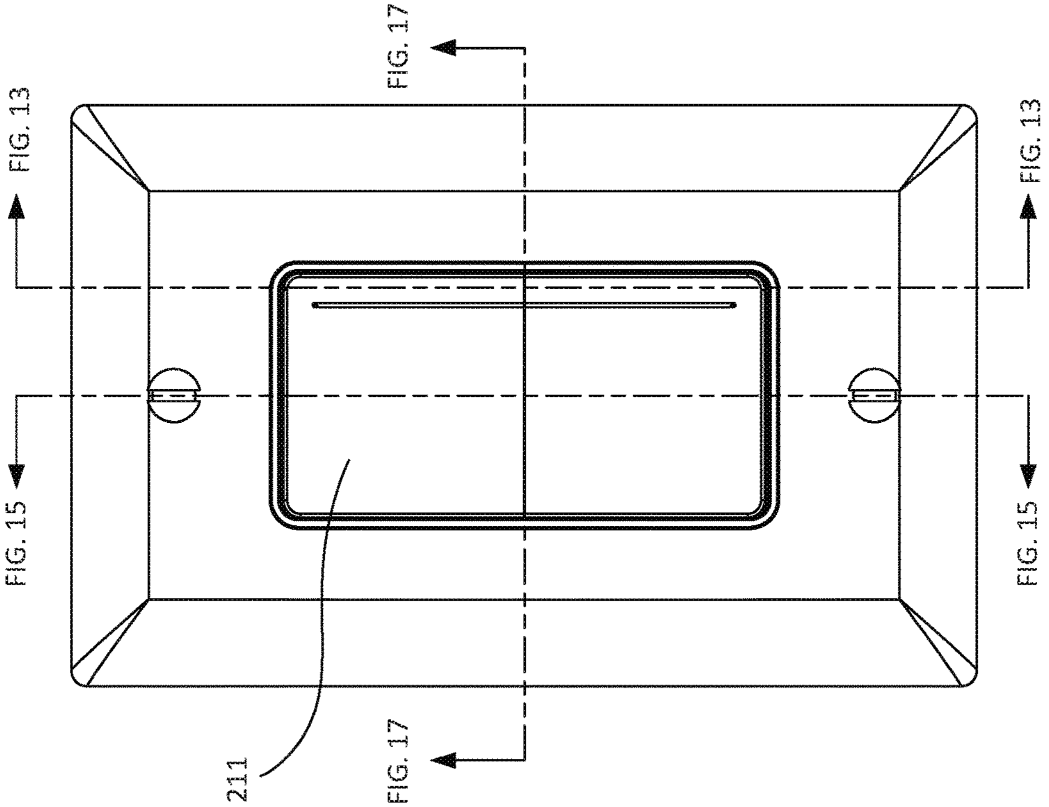
FIG. 4 is a front view of the example remote control device illustrated in FIGS. 2 and 3.

The remote control device 200 may be mounted to the light switch 202 in either orientation, for example, with the light bar 220 on the right side of the actuation portion 210 (e.g., as shown in FIGS. 2 and 3) or with the light bar on the left side of the actuation portion depending on the location of the protruding portion of the paddle actuator 204 of the light switch 202 in the on position. For example, the remote control device 200 may be configured to determine its orientation and determine what commands to transmit in response to actuations and/or how to illuminate the light bar 220 in response to the determined orientation.

Figure 8:
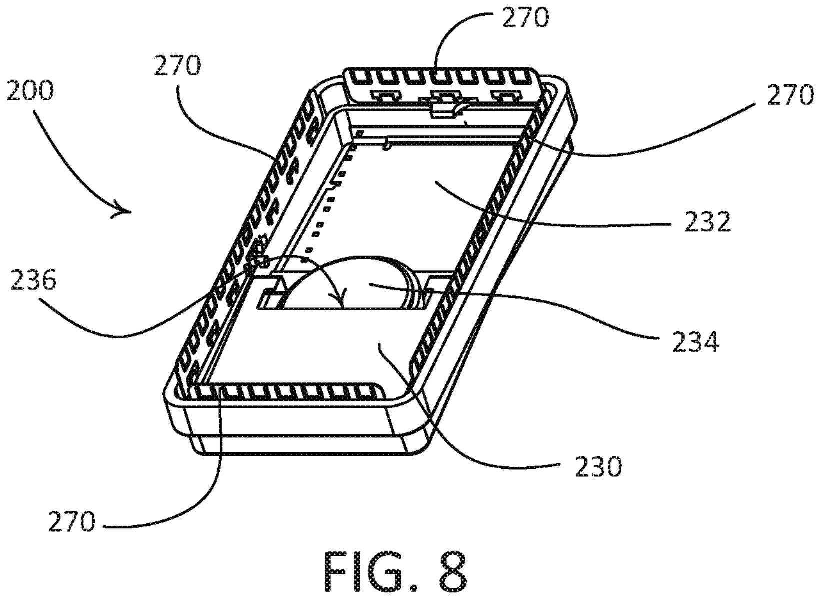
FIG. 8 is a rear perspective view of the example remote control device illustrated in FIGS. 2 and 3, with the remote control device unmounted from the light switch.
Figure 12:
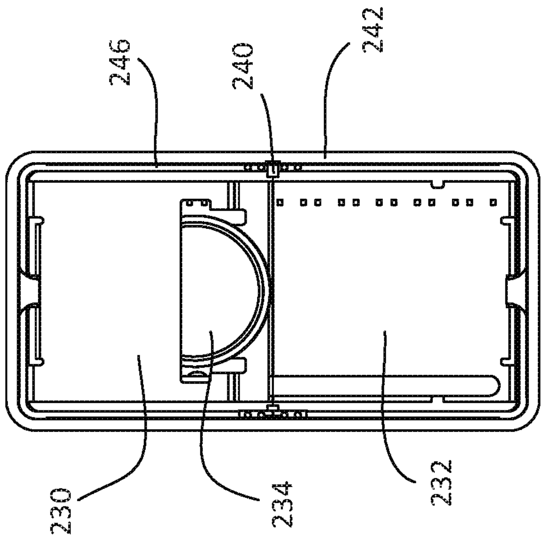
FIG. 12 is a rear view of the example remote control device illustrated in FIGS. 2 and 3, with the remote control device unmounted from the light switch.
Figure 10:
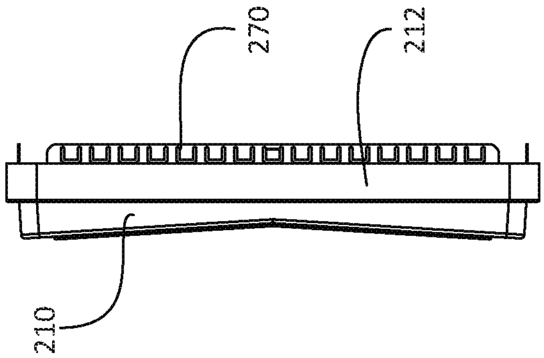
FIG. 10 is a right side view of the example remote control device illustrated in FIGS. 2 and 3, with the remote control device unmounted from the light switch.
Figure 9:
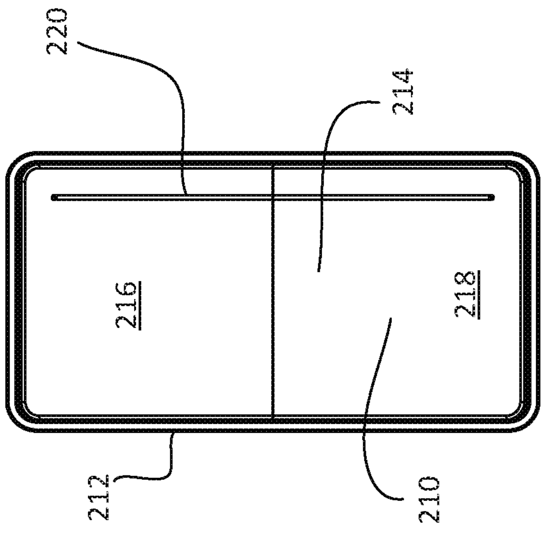
FIG. 9 is a front view of the example remote control device illustrated in FIGS. 2 and 3, with the remote control device unmounted from the light switch.
Figure 11:
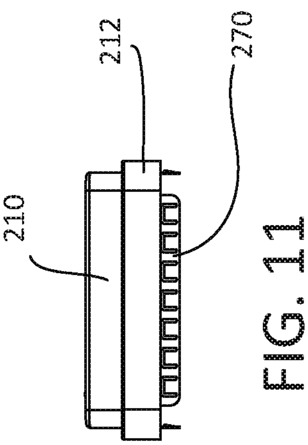
FIG. 11 is a bottom view of the example remote control device illustrated in FIGS. 2 and 3, with the remote control device unmounted from the light switch.

As shown in FIG. 8, the mounting structure may include extensions 270 that extend along each side of the base portion 212. However, it should be appreciated that the mounting structure of the remote control device 200 is not limited to the illustrated number or configurations of extensions 270. For example, the mounting structure of the remote control device 200 may alternatively include extensions 270 along two sides (e.g., opposing sides) of the base portion 212, or may include extensions 270 along three sides of the base portion 212.

As described herein, the extensions 270 are provided on the remote control device 200 having the actuator 211 that may pivot to allow for actuations of upper and lower portions 216, 218 and may define a touch sensitive surface. However, the extensions 270 may be provided on remote control devices having other sorts of user interfaces. For example, the extensions 270 may be provided on a remote control device having a touch sensitive surface that is non-planar and does not pivot. The extensions 270 may be provided on a remote control device having one or more buttons for receiving user inputs. The extensions 270 may be provided on a remote control device having an intensity adjustment actuator that moves with respect to the light switch to which the remote control is mounted, such as a rotary knob or a linear slider.

While the remote control device 200 shown in FIGS. 2-18 and described herein has a rectangular shape with a non-planar surface, the remote control device 200 could have other shapes. For example, the remote control device 200 (e.g., the actuation portion 210) may a square shape, a diamond shape, a triangular shape, a circular shape, an oval shape, or any suitable shape. The front surface 214 of the actuations portion 210 may be planar or curved. In addition, the light bar 220 may have alternative shapes, such as a curved shape. The light bar 220 may also be a piece-wise arrangement of multiple visual indicators that may have many shapes, such a circular shape, a square shape, a rectangular shape, a diamond shape, a triangular shape, an oval shape, or any suitable shape. The surfaces of the control module 420 may be characterized by various colors, finishes, designs, patterns, etc.

Figure 19:
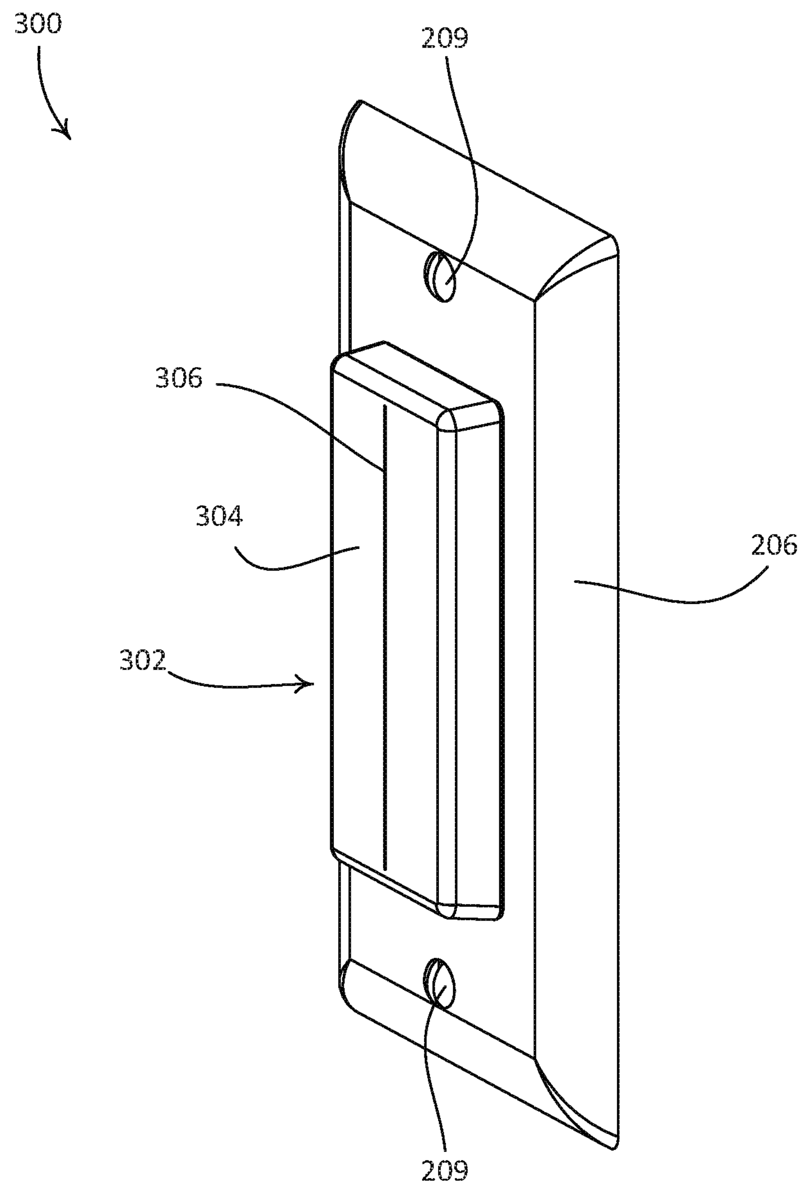
FIG. 19 is a perspective view of another example remote control device.
Figure 20:
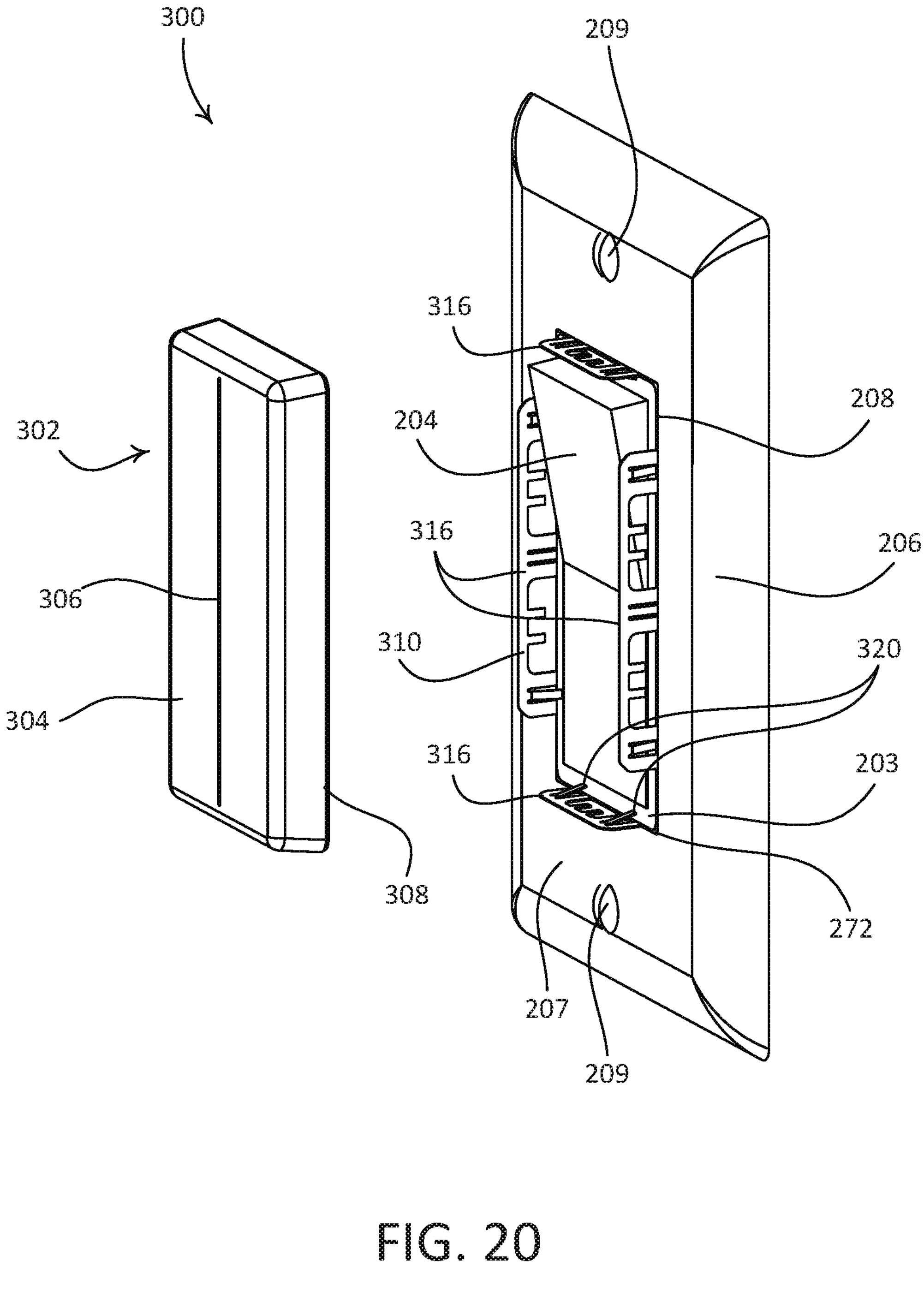
FIG. 20 is a perspective view of the example remote control device illustrated in FIG. 19, with a control module of the remote control device detached.
Figure 21:
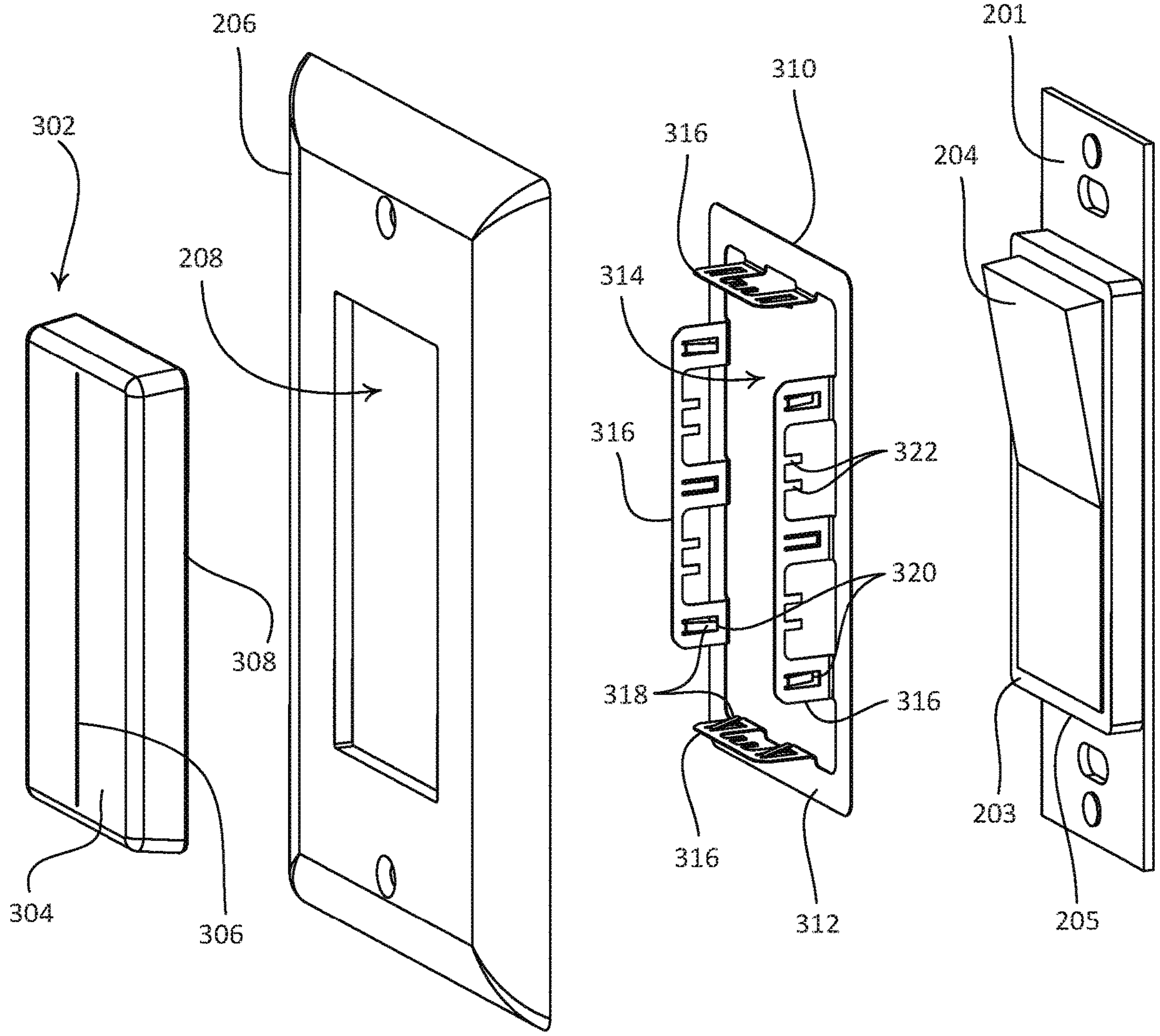
FIG. 21 is a partially exploded view of the example remote control device illustrated in FIG. 19.

FIGS. 19-21 depict another example remote control device 300 (e.g., a battery-powered remote control device) that may be deployed as the remote control device 120 of the load control system 100 shown in FIG. 1. The remote control device 300 may be configured to be mounted over a paddle actuator of a standard light switch, such as the paddle actuator 204 of the standard decorator paddle style light switch 202 shown in FIG. 20. As shown, the remote control device 300 may include a control module 302 (e.g., a control unit). The control module 302 may comprise an actuation portion 304 that may be a touch sensitive surface (e.g., may include or define a capacitive touch surface). The control module 302 may also include a light bar 306 that is configured to visibly display information at the touch sensitive surface. The control module 302 may be configured similarly, for example, to the example control modules described in greater detail in commonly assigned U.S. patent application Ser. No. 15/469,079, filed Mar. 24, 2017, entitled "Retrofit Remote Control Device," the entire disclosure of which is incorporated herein by reference.

The remote control device 300 may include a mounting structure that is configured to enable attachment of the remote control device 300 to a standard light switch, such as the light switch 202. For example, as shown the remote control device 300 may include a mounting structure 310. The mounting structure 310 may include a plate shaped base 312 that defines an opening 314 that extends therethrough. The mounting structure may include one or more extensions 316 that extend outward from the base 312. As shown, the extensions 316 may be configured as thin, flat planar extensions that extend perpendicular to the base 312 along respective inner perimeter edges of the opening 314.

The opening 314 may be sized to receive the bezel portion 205 of the light switch 202. The extensions 316 may define one or more alignment features that may abut corresponding portions of the bezel portion 205 of the light switch 202. For example, each extension 316 may define one or more tabs 318 that extend inward towards the opening 314. As shown, each tab 318 be angularly offset relative to its corresponding extension 316, and may extend from a fixed end to a free end 320 that is configured to abut a front surface 203 of the bezel portion 205 when the mounting structure 310 is mounted over the bezel portion 205 (e.g., as shown in FIG. 21).

The extensions 316 may be configured to be disposed into the gap 272 between the bezel portion 205 of the light switch 202 and the opening 208 of the faceplate 206. In an example of installing the mounting structure 310, the opening 314 may be disposed over the bezel portion 205 of the light switch 202 such that the free ends 320 of the tabs 318 abut the front surface 203 of the bezel portion 205. With the mounting structure 310 in place over the bezel portion 205 of the light switch 202, the faceplate 206 may be attached to a yoke 201 of the light switch 202, for instance using screws 209. When the faceplate 206 is attached to the yoke 201, the base 312 of the mounting structure 310 may abut an inner surface of the faceplate 206.

As shown in FIG. 20, when the mounting structure 310 is mounted to the bezel portion 205 and the faceplate 206 is attached to the yoke 201, the extensions 316 may protrude past a front surface 207 of the faceplate 206. The mounting structure 310 may be configured such that the control module 302 is releasably attachable to the portions of the extensions 316 that protrude beyond the front surface 207 of the faceplate 206. For example, as shown the extensions 316 may define one or more engagement members 322 that are configured to engage with complementary features (not shown) of the control module 302 to allow attachment of the control module 302 to the light switch 202 via the mounting structure 310. The engagement members 322 may engage a base portion 308 of the control module 302. The extensions 316 may operate to maintain the control module 302 of the remote control device 300 in a mounted position relative to the light switch 202, for example such that portions of the control module 302 abut corresponding portions of the faceplate 206. The mounting structure 310 may be made of any suitable material, such as metal.

The control module 302 may be mounted to the light switch 202 in one of two orientations (e.g., orientations that are 180° apart) depending on the location of the protruding portion of the paddle actuator 204 of the light switch 202 in the on position. For example, the control module 302 may be configured to determine its orientation and determine what commands to transmit in response to actuations and/or how to illuminate the light bar 306 in response to the determined orientation.

As shown, the mounting structure 310 may include extensions 316 that extend along each side of the opening 314. However, it should be appreciated that the mounting structure 310 is not limited to the illustrated number or configurations of extensions 316. For example, the mounting structure 310 may alternatively include extensions 316 along two sides (e.g., opposing sides) of the opening 314, or may include extensions 316 along three sides of the opening 314.

It should be appreciated that the remote control devices illustrated and described herein, such as the remote control devices 200, 300, are not limited to mounting to the light switch 202 via the corresponding illustrated mounting structures. For example, the remote control device 200 may be alternatively configured to be mounted to the light switch 202 via the mounting structure 310, and the control module 302 of the remote control device 300 may be alternatively configured with a mounting structure resembling that of the remote control device 200. In addition, the mounting structure 310 may be used to mount a remote control having one or more buttons for receiving user inputs, and/or a remote control device having an intensity adjustment actuator that moves with respect to the light switch to which the remote control is mounted, such as a rotary knob or a linear slider.

While the remote control device 300 shown in FIGS. 2-18 and described herein has a rectangular shape, the remote control device 300 could have other shapes. For example, the remote control device 300 may a square shape, a diamond shape, a triangular shape, a circular shape, an oval shape, or any suitable shape. The actuation portion 304 may be non-planar (e.g., curved). In addition, the light bar 306 may have alternative shapes, such as a curved shape. The light bar 306 may also be a piece-wise arrangement of multiple visual indicators that may have many shapes, such a circular shape, a square shape, a rectangular shape, a diamond shape, a triangular shape, an oval shape, or any suitable shape. The surfaces of the remote control device 300 may be characterized by various colors, finishes, designs, patterns, etc.

Figure 22:
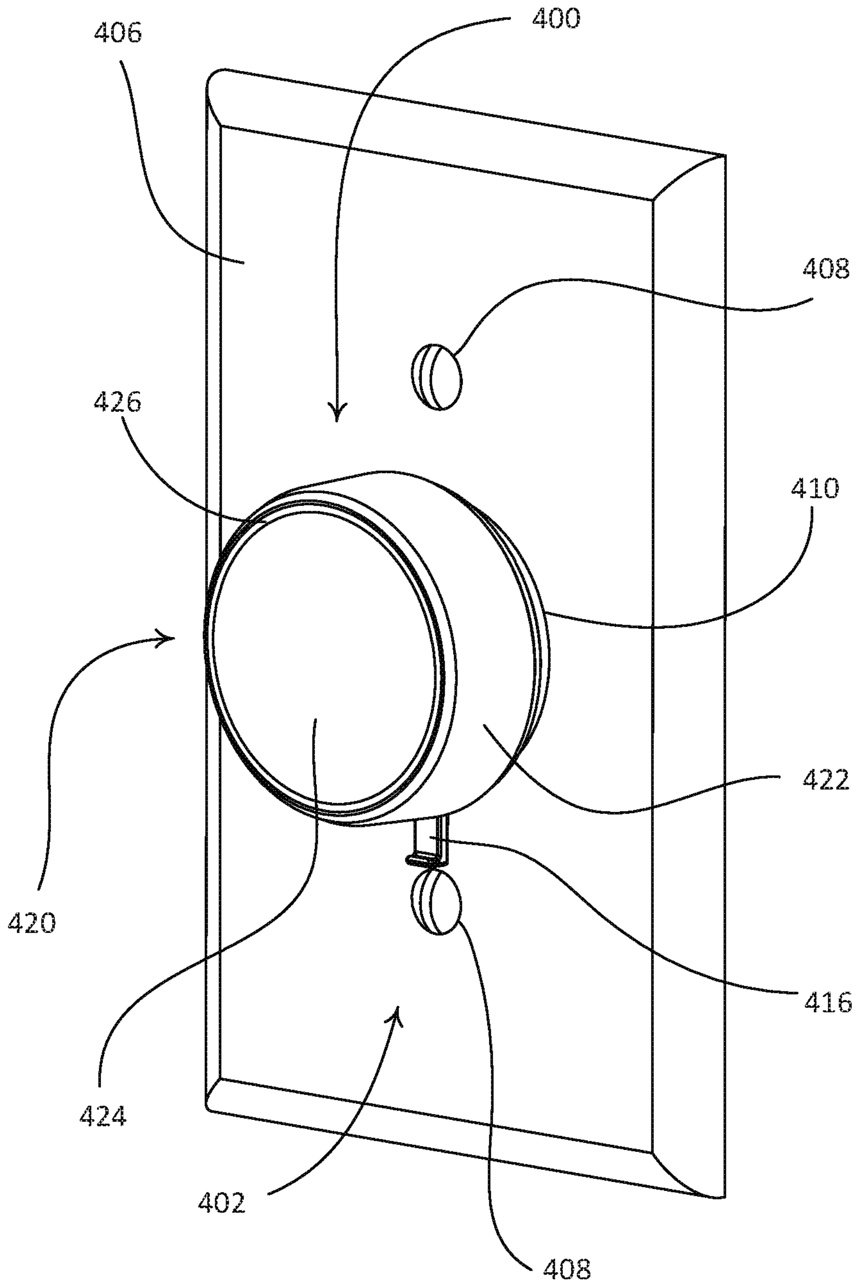
FIG. 22 shows a perspective view of another example remote control device.

FIG. 22 is a perspective view of an example remote control device 400 (e.g., a battery-powered rotary remote control device) that may be deployed as the remote control device 120 of the load control system 100 shown in FIG. 1. The remote control device 400 may be configured to be mounted over an actuator 404 of a standard light switch 402 (e.g., the toggle actuator 106 of the SPST maintained mechanical switch 104 shown in FIG. 1). The remote control device 400 may be installed over of an existing faceplate 406 that is mounted to the light switch 404 (e.g., via faceplate screws 408).

Figure 23:
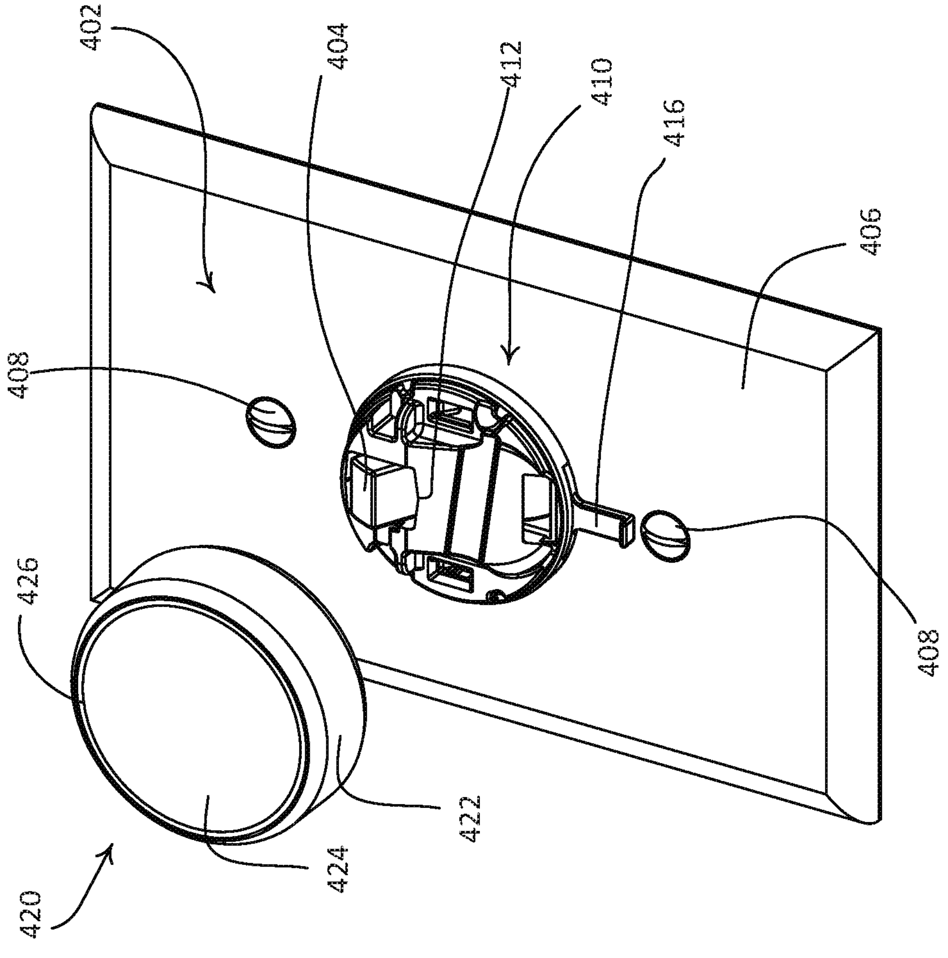
FIG. 23 shows a perspective view of the example remote control device of FIG. 22 with a control module detached from a base portion.

The remote control device 400 may include a base portion 410 and a control module 420 that may be operably coupled to the base portion 410. The control module 420 may be supported by the base portion 410 and may include a rotating portion 422 (e.g., an annular rotating portion) that is rotatable with respect to the base portion 410. FIG. 23 is a perspective view of the remote control device 400 with the control module 420 detached from the base portion 410. The base portion 410 may be configured to maintain the toggle actuator 204 in the on position. The toggle actuator 404 may be received through a toggle actuator opening 212 in the base portion 410. In this regard, the base portion 210 may be configured to prevent a user from inadvertently switching the toggle actuator 204 to the off position when the remote control device 200 is attached to the light switch 202.

The base portion 410 may be provided with a mounting structure (not shown) including extensions (e.g., similarly configured to extensions 270) that are configured to be disposed into a gap between the faceplate 406 and the toggle actuator 404. In addition, the base portion 410 may be configured to be attached to a mounting structure including extensions (e.g., similarly configured to extensions 316) that are configured to be disposed into a gap between the faceplate 406 and the toggle actuator 404. The base portion 410 of the remote control device 400 may be configured to define complementary features configured to engage with such extensions.

Figure 24:
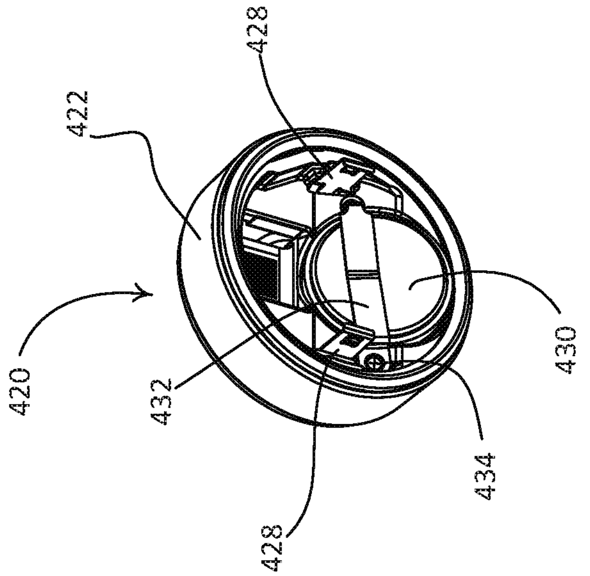
FIG. 24 shows a rear view of the control module depicted in FIG. 23.

The control module 420 may be released from the base portion 410. For example, a control module release tab 416 may be provided on the base portion 410. By actuating the control module release tab 416 (e.g., pushing up towards the base portion or pulling down away from the base portion), a user may remove the control module 420 from the base portion 410. FIG. 24 provides a rear view of the control module 420 of the remote control device 400. The control module 420 may comprise one or more clips 428 that may be retained by respective locking members (not shown) connected to the control module release tab 416 when the base portion 410 is in a locked position. The one or more clips 428 may be released from the respective locking members of the base portion 410 when the control module release tab 416 is actuated (e.g., pushed up towards the base portion or pulled down away from the base portion) to put the base portion 410 in an unlocked position. In an example, the locking members may be spring biased into the locked position and may automatically return to the locked position after the control module release tab 416 is actuated and released. In an example, the locking members may not be spring biased, in which case the control module release tab 416 may be actuated to return the base portion 410 to the locked position.

The control module 420 may be installed on the base portion 410 without adjusting the base portion 410 to the unlocked position. For example, the one or more clips 428 of the control module 420 may be configured to flex around the respective locking members of the base portion and snap into place, such that the control module is fixedly attached to the base portion.

The control module 420 may be released from the base portion 410 to access a battery 430 (e.g., as shown in FIG. 24) that provides power to at least the remote control device 400. The battery 430 may be held in place in various ways. For example, the battery 430 may be held by a battery retention strap 432, which may also operate as an electrical contact for the batteries. The battery retention strap 432 may be loosened by untightening a battery retention screw 434 to allow the battery 430 to be removed and replaced. Although FIG. 24 depicts the battery 430 as being located in the control module 420, it should be appreciated that the battery 430 may be placed elsewhere in the remote control device 400 (e.g., in the base portion 410) without affecting the functionality of the remote control device 400. Further, more than one battery may be provided. For instance, a spare battery may be provided (e.g., stored inside the control module 420) as replacement for the battery 430.

When the control module 420 is coupled to the base portion 410 as shown in FIG. 22, the rotating portion 422 may be rotatable in opposed directions about the base portion 410 (e.g., in the clockwise or counter-clockwise directions). The base portion 410 may be configured to be mounted over the toggle actuator 404 of the switch 402 such that the rotational movement of the rotating portion 422 may not change the operational state of the toggle actuator 404 (e.g., the toggle actuator 404 may remain in the on position to maintain functionality of the remote control device 400).

The control module 420 may comprise an actuation portion 424. The actuation portion 424 may in turn comprise a part or an entirety of a front surface of the control module 420. For example, the control module 420 may have a circular surface within an opening defined by the rotating portion 422. The actuation portion 424 may comprise a part of the circular surface (e.g., a central area of the circular surface) or approximately the entire circular surface. In an example, the actuation portion 424 may be configured to move towards the light switch 402 to actuate a mechanical switch (not shown) inside the control module 420 as will be described in greater detail below. The actuation portion 424 may return to an idle position (e.g., as shown in FIG. 22) after being actuated. In an example, the front surface of the actuation portion 424 may be a touch sensitive surface (e.g., a capacitive touch surface). The actuation portion 424 may comprise a touch sensitive element (e.g., a capacitive touch element) adjacent to the rear surface of the actuation portion. The touch sensitive element may be actuated in response to a touch of the touch sensitive surface of the actuation portion 424. In addition, the actuation portion 424 may be replaced by two or more buttons.

The remote control device 400 may be configured to transmit one or more wireless communication signals (e.g., the RF signals 108) to a load control device (e.g., the load control devices of the load control system 100, such as the controllable light source 110). The remote control device 400 may include a wireless communication circuit (e.g., an RF transceiver or transmitter (not shown)) via which one or more wireless communication signals may be sent and/or received. The control module 420 may be configured to transmit digital messages (e.g., including commands to the control the controllable light source 110) via the wireless communication signals (e.g., the RF signals 108). For example, the control module 420 may be configured to transmit a command to raise the intensity of the controllable light source 110 in response to a clockwise rotation of the rotating portion 422 and to transmit a command to lower the intensity of the controllable light source in response to a counterclockwise rotation of the rotating portion 422.

The control module 420 may be configured to transmit a command to toggle the controllable light source 110 (e.g., from off to on or vice versa) in response to an actuation of the actuation portion 424. In addition, the control module 420 may be configured to transmit a command to turn the controllable light source 110 on in response to an actuation of the actuation portion 424 (e.g., if the control module 420 possesses information indicating that the controllable light source is presently off). The control module 420 may be configured to transmit a command to turn the controllable light source 110 off in response to an actuation of the actuation portion 424 (e.g., if the control module possesses information indicating that the controllable light source is presently on). The control module 420 may be configured to transmit a command to turn the controllable light source on to full intensity in response to a double tap of the actuation portion 424 (e.g., two actuations in quick succession).

The control module 420 may be configured to adjust the intensity of the lighting load to a minimum intensity in response to rotation of the rotating portion 422 and may only turn off the lighting load in response to an actuation of the actuation portion 424. The control module 420 may also be configured in a spin-to-off mode, in which the control module 420 may turn off the lighting load after the intensity of the lighting load is controlled to a minimum intensity in response to a rotation of the rotating portion 422. The control module 420 may be configured to transmit a command (e.g., via one or more wireless communication signals such as the RF signal 118) to adjust the color of the controllable light source 110.

The control module 420 may comprise a light bar 426 that may be illuminated, for example, to provide feedback to a user of the remoted control device 400. The light bar 426 may be located in various areas of the remote control device 400. For example, the light bar 426 may be located between the rotating portion 422 and the actuation portion 424. The light bar may form different shapes. For example, the light bar 426 may form a full circle (e.g., a substantially full circle) as shown in FIGS. 22 and 23. The light bar 426 may be attached to a periphery of the actuation portion 424 and move with the actuation portion 424 (e.g., when the actuation portion is actuated). The light bar 426 may have a certain width (e.g., a same width along the entire length of the light bar). The exact value of the width may vary, for example, depending on the size of the remote control device 400 and/or the intensity of the light source(s) that illuminates the light bar 426.

The actuation portion 424 of the remote control device 400 may be configured to pivot about a pivot axis to allow for actuations of upper and lower portions (e.g., to turn the controlled electrical load on and off, respectively). The remote control device 400 may include mechanical tactile switches to provide tactile feedback in response to actuations of the upper and lower portions of the actuation portion 424. In addition, the remote control device 400 may be configured to raise and lower the intensity of the controlled lighting load in response to actuations of the upper and lower portions, respectively. The actuation portion may include a touch-sensitive surface (e.g., a capacitive touch surface).

The base portion 410 and the control module 420 may be mounted to the switch 402 in one of two orientations (e.g., orientations that are 180° apart) depending on the location of the protruding portion of the toggle actuator 404 of the light switch 402 in the on position. For example, the control module 420 may be configured to determine its orientation and determine what commands to transmit in response to actuations and/or how to illuminate the light bar 426 in response to the determined orientation.

While the control module 420 shown and described herein has a circular shape, the control module 420 could have other shapes. For example, the control module 420 (e.g., the rotating portion 422 and/or the actuation portion 424) may have a rectangular shape, a square shape, a diamond shape, a triangular shape, an oval shape, a star shape, or any suitable shape. The front surface of the actuations portion 424 and/or the side surfaces of the rotating portions 422 may be planar or non-planar. In addition, the light bar 426 may have alternative shapes, such as a rectangular shape, a square shape, a diamond shape, a triangular shape, an oval shape, a star shape, or any suitable shape. The light bar 426 may be continuous loops, partial loops, broken loops, a single linear bar, a linear or circular array of visual indicators, and/or other suitable arrangement. The surfaces of the control module 420 may be characterized by various colors, finishes, designs, patterns, etc.

Figure 25:
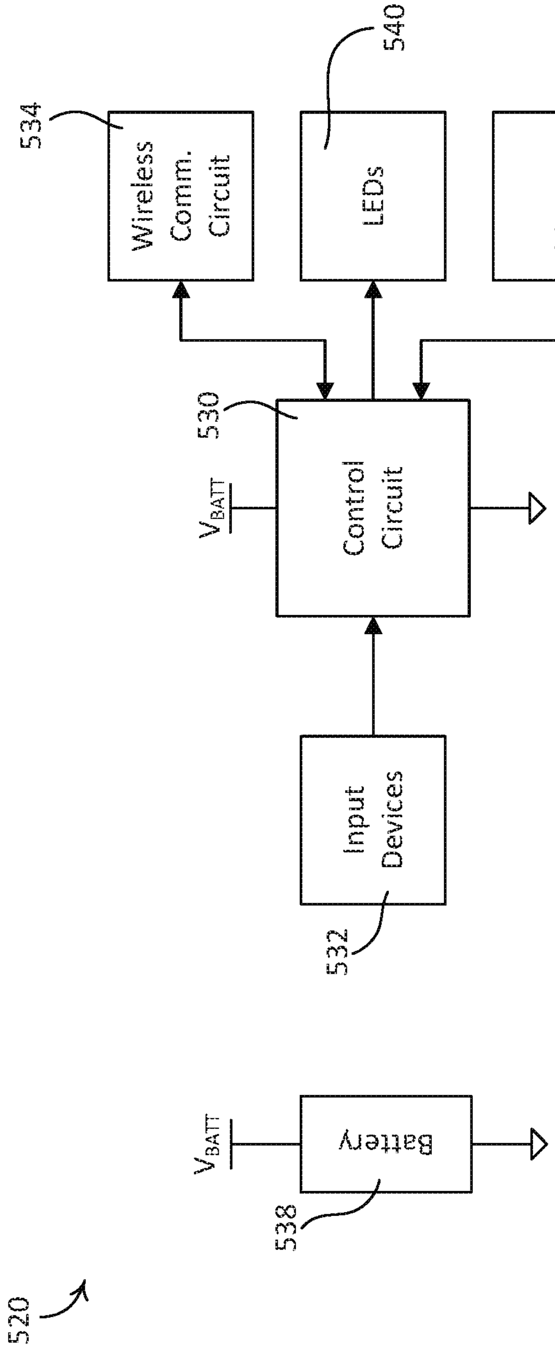
FIG. 25 shows a simplified equivalent schematic diagram of an example control module for the example remote control devices depicted in FIGS. 2, 19, and 22.

FIG. 25 is a simplified equivalent schematic diagram of an example control module 520 for a remote control device (e.g., the control module 220 of the remote control device 200, the control module 302 of the remote control device 300, and/or the control module 420 of the remote control device 200). The control module 520 may include a control circuit 530, input devices 532, a wireless communication circuit 534, a memory 536, a battery 538, and one or more LEDs 540. The input devices 532 may include an actuation portion, a rotating portion (e.g., a rotary knob), and/or a touch sensitive circuit (e.g., a capacitive touch circuit). The input devices 532 may be configured to translate a received user input (e.g., a force applied to the actuation portion(s), a force and/or time of user contact with the touch sensitive surface, a rotational speed and/or direction of a rotary knob, etc.) into input signals, and provide the input signals to the control circuit 530.

The control circuit 530 may be configured to translate the input signals into control signals for transmission to a load control device via the wireless communication circuit 534. For example, the control circuit 530 may be configured to translate the input signals received from the input devices 532 into control data for transmission to one or more external electrical loads via the wireless communication circuit 534. The LEDs 540 may be configured to illuminate a light bar (e.g., such as the light bar 226) and/or to serve as indicators of various conditions. The memory 536 may be configured to store one or more operating parameters (e.g., such as a preconfigured color scene or a preset light intensity) of the remote control device. The battery 538 may provide power to one or more of the components shown in FIG. 25.

The invention claimed is:

1. A remote control device adapted to be mounted over an actuator of a mechanical switch, the mechanical switch having a faceplate mounted thereto, the faceplate having an opening through which the actuator is received, the opening of the faceplate defining a gap between the faceplate and the actuator, the remote control device comprising:

- a base portion having a rectangular shape with a top wall, a bottom wall, and opposed sidewalls;
- a plurality of planar extensions that extend from two or more of the top wall, the bottom wall, or the opposed sidewalls of the base portion, the plurality of planar extensions adapted to be received in the gap between the faceplate and the actuator for holding the remote control device against the faceplate;
- an actuation portion pivotally supported by the base portion such that the actuation portion pivots with respect to the base portion;
- a wireless communication circuit; and
- a control circuit configured to transmit a digital message via the wireless communication circuit in response to an actuation of the actuation portion.

2. The remote control device of claim 1, wherein the actuation of the actuation portion comprises a user input.

3. The remote control device of claim 1, wherein the base portion defines cylindrical protrusions that extend from the opposed sidewalls.

4. The remote control device of claim 3, wherein the cylindrical protrusions define a pivot axis about which the actuation portion pivots.

5. The remote control device of claim 3, wherein the actuation portion is configured to be pivotally coupled to the cylindrical protrusions.

6. The remote control device of claim 5, wherein the actuation portion defines openings that are configured to receive the cylindrical protrusions.

7. The remote control device of claim 6, wherein each of the cylindrical protrusions are held in place within a corresponding one of the openings by a respective hinge plate that is connected to a rear surface of a respective sidewall of the actuation portion.

8. The remote control device of claim 7, wherein the hinge plates are connected to the rear surface of the respective sidewall via heat stakes.

9. The remote control device of claim 7, wherein the hinge plates are configured to maintain a distance between the hinge plate and a bezel portion of the mechanical switch.

10. The remote control device of claim 1, wherein each of the plurality of planar extensions comprise barbs that allow for insertion of the planar extensions in the gap, the barbs configured to bite into the faceplate to hinder removal of the remote control device.

11. The remote control device of claim 1, wherein the barbs are spring-style barbs that are configured to deflect as the planar extensions are inserted into the gap.

12. The remote control device of claim 1, wherein the actuator comprises a toggle actuator or a paddle actuator.

13. The remote control device of claim 1, wherein the planar extensions extend from each of the top wall, the bottom wall, and the opposed sidewalls.

14. The remote control device of claim 1, wherein the planar extensions extend along each side of the base portion.

15. The remote control device of claim 14, wherein the planar extensions are thin and flat to enable insertion within the gap.

16. A remote control device adapted to be mounted over an actuator of a mechanical switch, the mechanical switch having a faceplate mounted thereto, the faceplate defining an opening through which the actuator is received, the remote control device comprising:

- a mounting structure having a rectangular shape with a top wall, a bottom wall, and opposed sidewalls, the mounting structure configured to be disposed between a yoke of the mechanical switch and the faceplate, the mounting structure defining a plurality of planar extensions that extend from two or more of the top wall, the bottom wall, or the opposed sidewalls, wherein the plurality of planar extensions are configured to be disposed into a gap between the opening of the faceplate and the actuator and protrude beyond a front surface of the faceplate;
- an actuation portion pivotally supported by the mounting structure such that the actuation portion pivots with respect to the mounting structure;
- a wireless communication circuit; and
- a control circuit that is configured to transmit a digital message via the wireless communication circuit in response to an actuation of the actuation portion.

17. The remote control device of claim 16, wherein the actuation of the actuation portion comprises a user input.

18. The remote control device of claim 16, wherein the mounting structure defines cylindrical protrusions that extend from the opposed sidewalls.

19. The remote control device of claim 18, wherein the cylindrical protrusions define a pivot axis about which the actuation portion pivots.

20. The remote control device of claim 18, wherein the actuation portion is configured to be pivotally coupled to the cylindrical protrusions.

21. The remote control device of claim 20, wherein the actuation portion defines openings that are configured to receive the cylindrical protrusions.

22. The remote control device of claim 21, wherein each of the cylindrical protrusions are held in place within a corresponding one of the openings by a respective hinge plate that is connected to a rear surface of a respective sidewall of the actuation portion.

23. The remote control device of claim 22, wherein the hinge plates are connected to the rear surface of the respective sidewall via heat stakes.

24. The remote control device of claim 22, wherein the hinge plates are configured to maintain a distance between the hinge plate and a bezel portion of the mechanical switch.

25. The remote control device of claim 16, wherein the mounting structure defines four extensions that are configured to be disposed along corresponding portions of an inner perimeter of the opening.

* * * * *